US011325610B2

(12) United States Patent
Patnala et al.

(10) Patent No.: US 11,325,610 B2
(45) Date of Patent: May 10, 2022

(54) MAINTENANCE AND REPAIR SYSTEM FOR ADVANCED DRIVER ASSISTANCE FEATURES

(71) Applicant: Vehicle Service Group, LLC, Madison, WI (US)

(72) Inventors: Sreedhar Patnala, Madison, IN (US); Naor Pinto, Madison, IN (US); Mickey Swartz, Madison, IN (US); Brent Johnson, Grand Island, NE (US)

(73) Assignee: Vehicle Service Group, LLC, Madison, IN (US)

( * ) Notice: Subject to any disclaimer, the term of this patent is extended or adjusted under 35 U.S.C. 154(b) by 0 days.

(21) Appl. No.: 17/311,777

(22) PCT Filed: Aug. 28, 2019

(86) PCT No.: PCT/US2019/048668
§ 371 (c)(1),
(2) Date: Jun. 8, 2021

(87) PCT Pub. No.: WO2021/040708
PCT Pub. Date: Mar. 4, 2021

(65) Prior Publication Data
US 2021/0354707 A1    Nov. 18, 2021

(51) Int. Cl.
*B60W 50/032*     (2012.01)
*B60R 16/023*     (2006.01)
(Continued)

(52) U.S. Cl.
CPC ....... *B60W 50/032* (2013.01); *B60R 16/0231* (2013.01); *B60W 50/0205* (2013.01);
(Continued)

(58) Field of Classification Search
USPC ........................................... 701/29.2
See application file for complete search history.

(56) References Cited

U.S. PATENT DOCUMENTS 9,794,552 B1   10/2017   Ribble et al.
11,154,050 B2 *  10/2021  Hassanein ............ A01N 1/0247
(Continued)

FOREIGN PATENT DOCUMENTS

CN     102183945 A    9/2011
CN     103946897 A    7/2014
(Continued)

OTHER PUBLICATIONS

International Search Report and Written Opinion dated Nov. 20, 2019, for International Application No. PCT/US2019/048668, 8 pages.
(Continued)

*Primary Examiner* — Tyler D Paige
(74) *Attorney, Agent, or Firm* — Frost Brown Todd LLC

(57) ABSTRACT

A calibration and repair system for advanced driver assistance systems ("ADAS") and features is configured to provide secure, automated workflow management related to the calibration of User Remote ADAS. Automated workflows include steps and interfaces to aid in preparation of a vehicle for calibration, local-remote collaboration during calibration, customer interactions, workflow and event notification, user authentication, remote system management, and other tasks. The system is also capable of automatically and dynamically adding new and updated calibration specifications that are usable during local-remote collaboration.

20 Claims, 12 Drawing Sheets

(51) Int. Cl.

| | | |
|---|---|---|
| *G01S 7/497* | (2006.01) | |
| *G01S 17/931* | (2020.01) | |
| *G07C 5/00* | (2006.01) | |
| *G07C 5/08* | (2006.01) | |
| *H04L 67/12* | (2022.01) | |
| *B60W 50/02* | (2012.01) | |
| *B60W 30/09* | (2012.01) | |
| *B60W 50/00* | (2006.01) | |

(52) U.S. Cl.
CPC ............ *G01S 7/497* (2013.01); *G01S 17/931* (2020.01); *G07C 5/008* (2013.01); *G07C 5/0808* (2013.01); *G07C 5/0825* (2013.01); *G07C 5/0833* (2013.01); *H04L 67/12* (2013.01); *B60W 30/09* (2013.01); *B60W 2050/0083* (2013.01); *G07C 2205/02* (2013.01)

(56) References Cited

U.S. PATENT DOCUMENTS

| | | |
|---|---|---|
| 2007/0050105 A1 | 3/2007 | Chinnadurai et al. |
| 2012/0136802 A1 | 5/2012 | McQuade et al. |
| 2013/0246135 A1 | 9/2013 | Wang |
| 2015/0036885 A1* | 2/2015 | Pflug .................. G06T 7/73 382/104 |
| 2015/0142255 A1 | 5/2015 | Gormley |
| 2016/0267722 A1 | 9/2016 | Schroeder et al. |
| 2016/0335815 A1 | 11/2016 | Ryu et al. |
| 2017/0301154 A1 | 10/2017 | Rozint |
| 2018/0319250 A1* | 11/2018 | McQuillen ......... B60H 1/00828 |
| 2018/0320609 A1* | 11/2018 | McQuillen .......... F02D 41/0047 |
| 2018/0320645 A1* | 11/2018 | McQuillen ............ F02D 41/144 |
| 2019/0232972 A1* | 8/2019 | Lin .................... B60W 50/045 |
| 2019/0258251 A1 | 8/2019 | Ditty et al. |
| 2019/0371091 A1* | 12/2019 | Frisch .................. G07C 5/0808 |
| 2021/0005031 A1 | 1/2021 | Brauer et al. |

FOREIGN PATENT DOCUMENTS

| | | |
|---|---|---|
| CN | 106864462 A | 6/2017 |
| CN | 109791635 A | 5/2019 |

OTHER PUBLICATIONS

Extended European Search Report dated Sep. 20, 2021, for EP App. No. 19943307.9, 9 pages.

Chinese Office Action and Search Report dated Sep. 14, 2021, for Application Serial No. 201980072120.3, 7 pages.

\* cited by examiner

MAINTENANCE AND REPAIR SYSTEM FOR ADVANCED DRIVER ASSISTANCE FEATURES

BACKGROUND

An advanced driver assistance system ("ADAS") may be implemented in vehicles to aid drivers by providing information, improved visibility, and even autonomous control. ADAS examples include simple systems such as anti-lock braking or tire pressure monitoring, but they may also include more complex systems that utilize cameras for image capture and analysis and perform depth sensing with laser light detection (e.g., LIDAR) or other equipment in order to automatically brake or steer to avoid collisions. Examples of ADASs that utilize cameras, depth sensors, and other advanced imaging and sensing devices to aid drivers include adaptive cruise control, adaptive light control, automatic parking, blind spot monitoring, night vision, drowsiness detection, collision warning and avoidance, lane departure warning and centering, traffic sign recognition, and other features.

While the various ADAS functionalities can improve the driving experience and reduce risks related to human error, environmental conditions, and other driving conditions, they may be sensitive to miscalibration due to their relatively high complexity. As an example, a collision avoidance system may include one or more cameras and one or more depth sensors positioned behind the front windshield of the vehicle and oriented towards the road. To effectively sense potential collisions, such devices may need to be correctly oriented to capture the entirety of the road and may need to be positioned correctly relative to the windshield so that the glass does not interrupt imaging and/or depth sensing by the devices. This calibration may be performed at the time of manufacture or sale of the vehicle and may require a fairly sophisticated understanding of the ADAS implementation such as may be available to the manufacturer or a dealership.

Recalibration of ADAS features may be required in some instances, such as after a collision or vehicle impact, after a component of the ADAS or a structure that supports such a component is damaged, shifted, or replaced as a result of a vehicle impact, after replacement of windshield glass, and in other cases. Vehicle repair after a collision is often performed by a collision repair center, mechanical shop, or fleet owners as opposed to being performed by a shop that is directly affiliated with the original manufacturer of the vehicle (e.g., an "OEM" shop). As a result, those repairing a vehicle may not possess the equipment, training, calibration specifications, or other requirements for recalibrating the ADAS after repair of the vehicle. When recalibration is needed, a subsequent trip to an OEM shop may be required, which may be inconvenient for the vehicle owner and may require the vehicle to be driven while the ADAS features are unavailable or operating erroneously.

What is needed is an improved system for the maintenance and repair of ADASs.

BRIEF DESCRIPTION OF THE DRAWINGS

While the specification may conclude with claims which particularly point out and distinctly claim the invention, it is believed the present invention will be better understood from the following description of certain examples taken in conjunction with the accompanying drawings, in which like reference numerals identify the same elements and in which:

Figure 1:
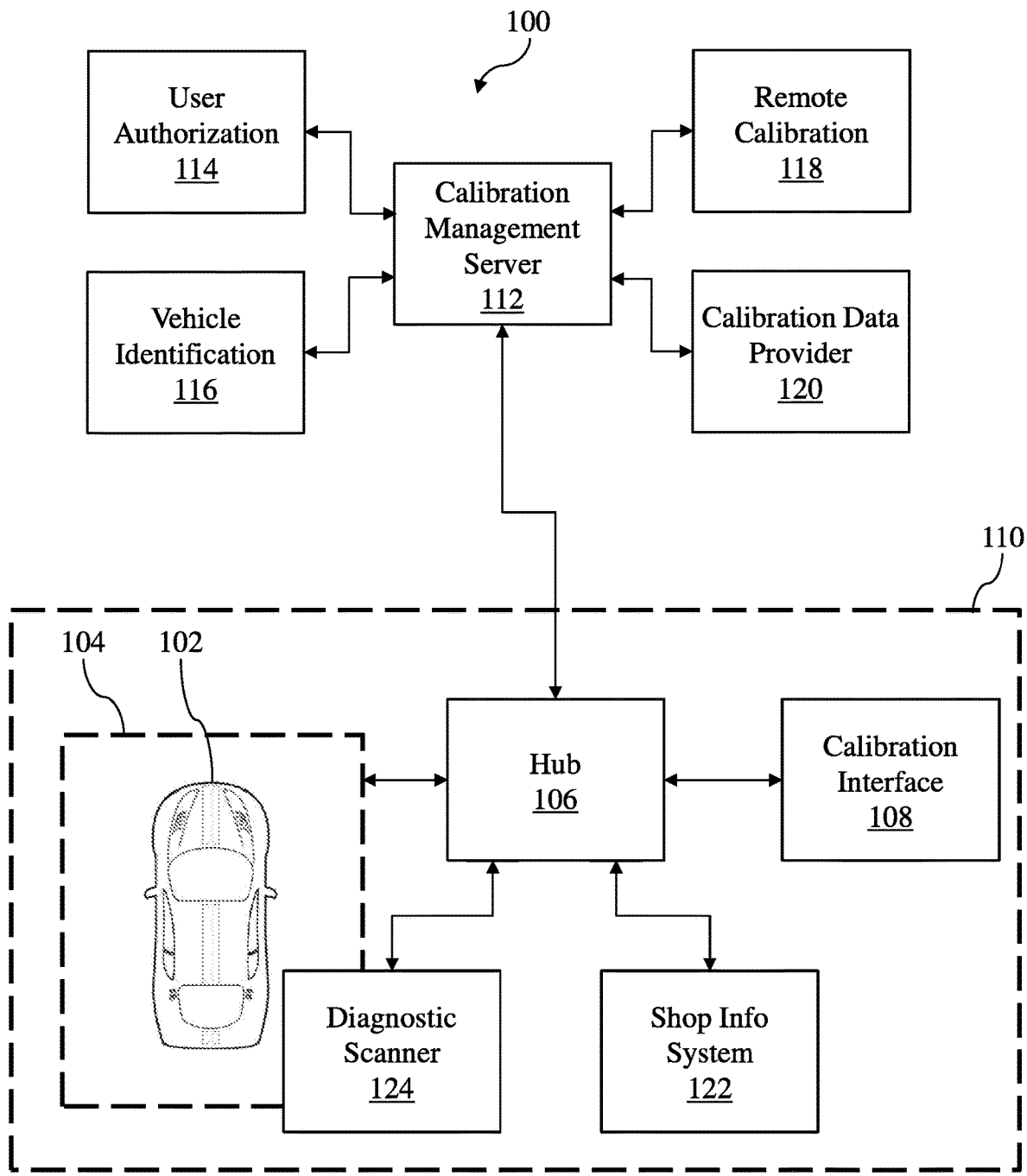
FIG. 1 is a schematic diagram showing a system architecture for an exemplary calibration and repair system for advanced driver assistance systems.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention; it being understood, however, that this invention is not limited to the precise arrangements shown.

DETAILED DESCRIPTION

The following description of certain examples of the invention should not be used to limit the scope of the present invention. Other examples, features, aspects, embodiments, and advantages of the invention will become apparent to those skilled in the art from the following description, which is, by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

I. Calibration and Repair System

FIG. 1 is a schematic diagram showing a system architecture for an exemplary calibration and repair system (100)

for advanced driver assistance systems ("ADAS"). The calibration system (100) includes a local environment (110), which may be implemented at a repair shop, vehicle service shop, or other physical location at which a vehicle may be received and worked upon, and also includes components that may be remotely located relative to the local environment (110). In this manner, the calibration system (100) may be described as a distributed calibration system. Remotely located components may be implemented as one or more physical servers, virtual servers, cloud hosted servers, distributed computing servers, or other variations as will be apparent to one skilled in the art in light of this disclosure.

A calibration management server (112) may be configured to provide a number of features, as will be described in more detail below, including the control of communications between the remote components and the local environment (110). The calibration management server (112) is communicatively coupled with a hub (106) that is within the local environment (110). Each local environment (110) may have one or more hubs (106), such that the calibration management server (112) may be communicatively coupled with a plurality of hubs (106) distributed across a plurality of distinct local environments (110).

The hub (106) is configured to serve as a gatekeeper between the devices of the local environment (110) and the outside world, which may include remotely located components as well as computers and network devices that are located in the local environment (110) but are not part of the calibration system (100). As an example, one such feature provided by the hub (106) is a secure dedicated network that is configured to only communicate with a set of pre-authorized devices, such as the calibration management server (112). With the hub (106) configured as described, a laptop computer or smartphone proximate to the local environment (110) would not be able to connect to the secure dedicated network, and a remotely located server other than the calibration management server (112), such as a server hosting a publicly accessible website or web service, would not be able to communicate with the hub (106) or any device on the dedicated network.

In this manner, the hub (106) can provide a high level of security and predictability for the calibration system (100). For example, customers or employees proximate to the local environment (110) will be unable to connect additional devices to the hub (106), which minimizes unnecessary traffic and security vulnerabilities. Similarly, devices outside the local environment (110) will be unable to detect or interact with the hub (106), and all communications between the hub (106) and the calibration server (112) across the wide area network may be encrypted and digitally signed to aid in authentication.

Local devices connecting to the hub (106) may include server and computer systems, internet of things ("IoT") devices and components, and other computer and network devices, which may be collectively referred to as edge devices. In FIG. 1, a calibration station (104), a scanner (124), a shop information system ("SIS"), and a local technician device (108) are connected to the hub (106). These devices may be connected to the hub (106) wirelessly via WI-FI or BLUETOOTH, or may be connected via ethernet, USB, or other hardwired connection. The calibration station (104) may include a vehicle pad where a vehicle (102) may be parked for calibration and may also include a target positioning system which is operable to automatically move and position a target surface relative to a vehicle parked on the vehicle pad.

For example, the target surface may be a flat rectangular structure with a front surface adapted to provide precise and accurate signal interaction with sensors of a vehicle ADAS. This could include the surface being adapted to predictably reflect light and laser radiation instead of absorbing or scattering such transmissions. During calibration of one or more ADAS features, the target surface may be automatically positioned relative to the vehicle (102) to simulate a vehicle or other road obstruction. The calibration station (104) may also include cameras, sensors, and other devices usable to aid in positioning the vehicle (102) on the vehicle pad properly, as will be described in more detail below.

The diagnostic scanner (124) is also in communication with the hub (106). The diagnostic scanner (124) may be coupled with control systems of the vehicle (102) and is configured to exchange information with the vehicle (102). As an example, the diagnostic scanner (124) may include on-board diagnostics ("OBD") capabilities, such as OBD-II, that allow the diagnostic scanner (124) to receive information from the vehicle's (102) electrical control unit ("ECU"), which may itself be in communication with the vehicle's (102) ADAS features. The diagnostic scanner (124) is also capable of transmitting information to the vehicle's (102) ECU to allow reconfiguration and recalibration of the ADAS features and other vehicle systems.

The diagnostic scanner (124) also includes a communication device capable of communicating with the hub (106) within the secure and dedicated network, as well as a processor, memory, user interface, and other features as will be apparent to one skilled in the art in light of this disclosure. The diagnostic scanner (124) may include user interfaces that allow operation by users proximate to the local environment (110) (e.g., buttons, a display, a touch screen interface), operation by remotely located users (e.g., a software interface that can receive and act upon control signals provided via the hub (106) and calibration management server (112)), or both. Remote operation of the diagnostic scanner (124) may be advantageous for allowing local-remote collaboration during ADAS calibration, as will be described in more detail below.

In some implementations, the diagnostic scanner (124) may not be in direct communication with the hub (106), such as where a particular local environment uses a proprietary scanner or offline scanner that is not directly associated with the calibration system (10). In such cases, information may be provided from the scanner to the calibration interface (108) in order to be indirectly provided to the hub (106). This may include, for example, manually typing in a VIN or other diagnostic information from a scanner into the calibration interface (108) or capturing an image of the scanner display with a camera of the calibration interface (108) which may be analyzed for information. In this manner, a particular user may still take advantage of many features of the calibration system (100) even where they prefer to use a proprietary scanner, or prefer to rely entirely on local technicians (e.g., as opposed to relying at least in part on remote technicians, as will be described below in the context of the remote technician device (118)).

The local technician device (108) is also in communication with the hub (106). The local technician device (108) may be, for example, a laptop, a tablet device, a smartphone, a proprietary device, or another similar computing device, and may be configured to allow a technician that is proximate (e.g., a "local technician") to the local environment (110) to interact with other components of the calibration system (100), as will be described in more detail below. As an example, the local technician device (108) may be a tablet device configured with software and settings to restrict communication to the hub (106), and to display information and other electronic communications received from the calibration management server (112). Such communication may include instructions, images, audio, or video relating to a task being performed by the local technician, or it may include notifications from a remote system (e.g., the calibration management server (112) or person (e.g., a technician located outside the local environment (110), or a "remote technician") that a preceding task is complete or a subsequent task may be initiated.

The SIS (122) is also in communication with the hub (106), and may be, for example, a physical server or remote server that is configured to provide point-of-sale, customer management, and vehicle management features for the local environment (110). The SIS (122) may exchange information with the hub (106) that is related to ADAS calibration. Such information may include, for example, vehicle information, vehicle owner information, authorizations and instructions to perform one or more calibration tasks, invoicing and billing information, and other information that is used or useful during ADAS calibration.

As has been described, the hub (106) isolates all communications with the local environment and within the local environment to those that are pre-configured by providing the distributed network for local devices, and acting as gatekeeper to remote devices which requires all communications to arrive via the calibration management server (112) in the expected format. This allows the calibration management server (112) to communicate with other remote servers and services using secure communication features such as SSL, VPN, encryption, and strong user and system authentication (e.g., multi-factor authentication).

With such an implementation, the calibration management server (112) may provide internally implemented functionality (e.g., software features and functions that are implemented on the same server or device as the calibration management server (112) or within its trusted network) to the calibration system (100) and may also provide externally implemented functionality (e.g., software features and functions that are implemented on a third-party server or device, outside the trusted network of the calibration management server (112)) while still maintaining a high level of isolation for the hub (106).

As an example, such external functionality could include communication with a vehicle identification interface (116) that is operable to receive a VIN or other vehicle identifying information and return information that positively identifies the make, model, year, and ADAS features present in an identified vehicle. In this manner, a VIN provided from the SIS (122) or the diagnostic scanner (124) may be transmitted via the hub (106) to the calibration management server (112), used to retrieve information from the vehicle identification interface (116), and then transmitted back to the hub (106) for use in the local environment (110) during ADAS calibration.

As another example of external functionality, a user authorization interface (114) may be in communication with the calibration management server (112), and may be operable to authorize local technicians, remote technicians, or other parties involved in ADAS calibration prior to allowing such tasks to be performed with the calibration system (100). The user authorization interface (114) may verify a username and password, may require multi-factor authentication and/or biometric authentication, and may also provide additional types of task specific user authentication, such as verifying electronic records that indicate a certain user is trained or certified to perform certain tasks or features for which they are requesting access or control, as will be described in more detail below.

As another example of external functionality, a remote technician device (118) may be in communication with the calibration management server (112) and may be usable to enable collaboration between a remote technician and a local technician during a calibration being performed in the local environment (110). Such communication may include sharing of information (e.g., text, images, video) and collaborative control of the calibration station (104), the diagnostic scanner (124), and other devices used during calibration, as will be described in more detail below. As an example, during performance of a calibration, the diagnostic scanner (124) may access the ECU of the vehicle (102) and receive information from a forward collision detection ADAS indicating the position of the target surface relative to the vehicle (102). Such information may pass through the calibration management server (112) to the remote technician via the remote local technician device (118), who may compare the information to expected values, and then transmit an updated ADAS configuration along the reverse path back to the vehicle (102).

As another example of external functionality, a calibration data provider interface (120) may be in communication with the calibration management server (112) and may be usable by various third-party data providers to add new calibration specifications to the calibration system (100), as will be described in more detail below. Third-party data providers may include vehicle original equipment manufacturers ("OEMs") or other parties having the equipment and expertise to develop specifications and materials relating to the precise and accurate calibration or reconfiguration of ADAS features for vehicles. New calibration specifications may be needed when a new vehicle is introduced (e.g., a new model, a new model year, a new trim or feature set, etc.) or, in some cases, where calibration specifications or ADAS configurations for a previously existing vehicle are updated or improved subsequent to their original release. The calibration data provider interface (120) allows new and updated specifications to be submitted and automatically processed and integrated with the calibration system (100) such that they can be available for use in the local environment (110) within a short time of being provided to the calibration management server (112) and without manual intervention by an administrator or other party responsible for the calibration system (100).

While the examples above are described as external functionality that is accessible through a software interface, it should be understood that some or all of such features may be internally implemented on the calibration management server (112) or on servers within its trusted network, as will be apparent to one skilled in the art in light of this disclosure.

Variations on the system (100) of FIG. 1 exist and will be apparent to one skilled in the art in light of this disclosure. For example, in some implementations all or part of the diagnostic scanner (124) may be an integrated component of the vehicle (102) rather than a handheld or external device. In such an implementation, the diagnostic scanner (124) may wirelessly connect directly to the hub (106) without being manually connected or physically attached, or it may wirelessly connect with the SIS (122) or another device which itself is connected to the hub (106). In still other implementations, portions of the data collection described herein take place on the vehicle and are communicated via telematics or maintenance call-ahead channels as will be appreciated by those skilled in the art.

Figure 2:
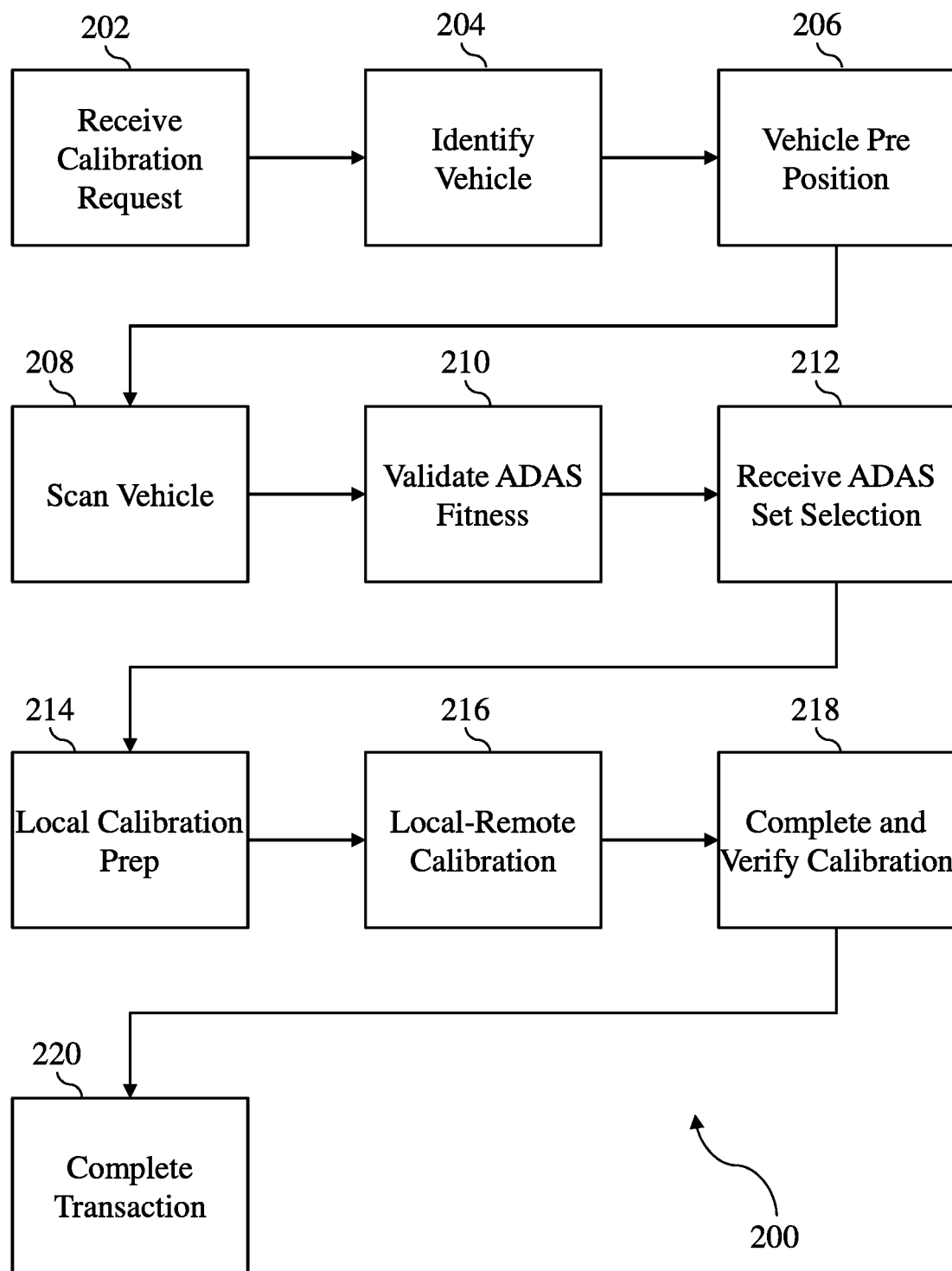
FIG. 2 is a flowchart showing an exemplary set of high-level steps that may be performed with the calibration and repair system of FIG. 1.

While some of the features and functions of the calibration system (100) have been described above as examples, additional features and functions exist and are possible. As an example, FIG. 2 shows a set of high-level steps (200) that may be performed with the calibration system (100). The high-level steps (200) encompass numerous functionalities that may be performed during a complete process related to vehicle calibration. The sequence and dependencies between steps of the workflow may be enforced by a state machine, workflow engine, or similar process of the calibration management server (112).

At a first step shown in FIG. 2, a calibration request may be received (202) by the calibration management server (112). The calibration request may originate from the SIS (122) or the local technician device (108), for example, and may be received by the calibration management server (112) via the hub (106) as has been described. The calibration request may contain information such as a work order or vehicle intake dataset and may include a VIN that uniquely identifies the vehicle. The vehicle may be identified (204) based upon the information in the calibration request, such as by communication with the vehicle identification interface (116) or a similar interface or dataset. Once the vehicle is identified (204), its basic characteristics may be available, such as its physical dimensions, weight, and ADAS features that the vehicle is expected to include based upon the manufacturer's specifications. Additional data from sensors on-board the vehicle (102) may also be made available to the calibration management server (112), either as part of the calibration request or related communications, such as ride height, sensor height, tire pressure, and other data as will occur to those skilled in the art in view of this disclosure.

With reference to FIG. 1, the vehicle (102) may then be pre-positioned (206) in the calibration station (104). Pre-positioning (206) may be performed by a local technician in the local environment (110) and may be aided by the local technician device (108) and/or one or more sensors or devices that are components of, or positioned proximately to, the calibration station (104). As an example, the local technician device (108) may be configured to, during this step of a process, automatically display an illustrative vehicle positioning guide that is generally applicable, or that is specifically applicable to the identified (204) vehicle. In some implementations, the local technician device (108) may be configured to automatically display live video captured by cameras positioned around the calibration station (104), which may additionally include graphical overlays rendered on the live video to indicate proper positioning. In some implementations, the local technician device (108) may be configured to automatically display sensor feedback from depth sensors, weight sensors, or other sensors positioned in and around the calibration station (104), which may indicate whether the vehicle is centered on the vehicle pad, too close to the target surface, too far from the target surface, or other characteristics.

In some implementations, the local technician device (108) may be configured to automatically display or make available two or more of the above interfaces, as may be desirable. As has been described, the calibration system (100) may be configured such that all information generated by cameras, sensors, or other devices during pre-positioning (206) may pass through the hub (106) prior to being displayed on the local technician device (108), and such information may also be transmitted in whole or in part to the calibration management server (112), which may save and associate such information with the specific workflow and task being performed.

Once the vehicle (102) is positioned (206), the local technician may couple the diagnostic scanner (124) with the vehicle (102) and scan (208) the vehicle (102) for additional information related to the presence of ADAS features. Such information may be displayed on the local technician device (108) and saved by the calibration management server (112) and associated with the workflow and task as has been described, and as will be the case with all or most of the information passing through the hub (106), as will be apparent to one skilled in the art in light of this disclosure.

With such information available, the fitness of the vehicle's (102) ADAS features may be evaluated and validated (210) to identify any features that may not be prepared for calibration. Validation (210) may be performed by the calibration management server (112), the local technician device (108) (e.g., typically based upon evaluation and validation rules provided by the calibration management server (112)), or both. Validation may be useful for several reasons. As an example, while some or all of the ADAS features of the vehicle (102) may be identified based upon its VIN, this may not always be the case, so validation (210) of the ADAS features based upon the scan (208) of the vehicle may identify additional ADAS features present in the vehicle (102). As another example, an ADAS feature may be present in the vehicle (102) but may be malfunctioning and reporting an error message due to equipment failure or unrepaired damage from a collision. Thus, validation (210) may avoid unnecessary attempts to calibrate features that are not present or are malfunctioning or may allow previously unidentified ADAS features to be calibrated.

With a valid set of ADAS features identified, a local technician or vehicle owner may select one or more of the ADAS features for which calibration is desired from the list of identified ADAS features. Such a selection may be made via the local technician device (108), the SIS (122), or another device, as has been described, with the selected set of ADAS features being received (212) by the calibration management server (112) and used to prepare and enforce the various associated workflow tasks and steps.

While the specific steps performed to calibrate the selected (212) ADAS features will depend upon the number and type of features selected, they may be generally characterized as a step of local calibration preparation (214) followed by a step of local-remote calibration (216). These steps may be performed collectively for one or more ADAS feature calibrations or may be performed individually for each selected ADAS feature calibration. For example, where four separate ADAS features are selected (212) for calibration, local calibration preparation (214) and local-remote calibration (216) may be performed corresponding to each individual feature, such as where the local technician may have to reposition the vehicle (102) or prepare different equipment between each feature calibration.

One advantage of the calibration system (100) is the possibility for local-remote collaboration during calibration. This may be advantageous because it allows the remote technician to assist in calibrations for a plurality of environments like the local environment (110) regardless of the geographical locations and distributions of the local technician and the individual shops. Due to the complexity of many ADAS features, the remote technician may require significant training and certification in order to properly calibrate and service the vehicle (102). However, the demand for ADAS calibration at a particular local environment (110) may be such that it is impossible or inefficient to have a technician with the capabilities of the remote technician at each and every local environment (110).

By allowing the remote technician to collaborate with a local technician during local-remote calibration, the remote technician's skillset can be applied to the plurality of local environments on demand and regardless of geographical concerns. As another advantage, where the remote technician is able to perform the most complex portions of ADAS calibration remotely, the training and expertise requirement for the local technician may be reduced to tasks and steps that are not easily performed by the remote technician, such as positioning the vehicle (102) in the calibration station (104), physically attaching the diagnostic scanner (124), and attaching or placing other devices and equipment related to the calibration.

In this manner, the calibration management server (112) may enforce the workflow to guide the local technician through local calibration preparation (214), which may include further re-positioning of the vehicle, preparation of the calibration station (104) (e.g., visually confirming that no tools or other objects have been left in the area which may interfere with calibration), preparation of the target surface (e.g., applying a specific cover or attachment to the target surface required for a specific calibration), preparation of the vehicle (102) (e.g., attaching calibration and alignment aids to wheels or other structures of the vehicle, such as in the case of reflective wheel clamps that attach to the wheels to aid in proper alignment and positioning of a vehicle during calibration), and other physical tasks that must be performed in and around the local environment (110).

Once the local calibration preparation (214) is complete, which may be indicated by the local technician acknowledging completion via the local technician device (108), or an automated process determining that preparation work is complete based upon sensor feedback, or both, local-remote calibration (216) may be performed for one or more ADAS features, as will be described in more detail below. As one example, when local-remote calibration (216) is performed, the local technician and remote technician may communicate and collaborate via the local technician device (108) and the remote local technician device (118) using text, audio, video, images, or other exchanged information to enable the remote technician to gather necessary diagnostic information to allow the ADAS feature(s) to be recalibrated and reconfigured until sensor results reflect performance within the associated calibration specification.

While performing the calibration remotely, the remote technician may request that the local technician reposition the vehicle, visually confirm aspects of the calibration station (104) and vehicle (102) or perform other manual tasks in the local environment (110). The local technician may also act as a visual spotter during local-remote calibration and may be able halt the process via the local technician device (108) if there is a safety concern, such as where the target surface may be automatically repositioning relative to the vehicle (102) and a nearby person appears to be in the path of the moving structure. Each technician may also serve as a check on the automated positioning of the target surface and on any manual positioning of the vehicle (102) or the target surface, to allow for fine tuning where there is a concern. For example, the remote technician may, based upon sensor, image, or video information request that the local technician reposition the vehicle. As another example, the local technician may, based sensor, image, or video information, or based upon local visual inspection, request that the remote technician reposition the target surface or repeat another step of calibration.

Once calibration of each ADAS feature is complete, the calibration may be completed and verified (218) by the local technician. This may include removing any equipment form the vehicle (102) (e.g., the diagnostic scanner (124), wheel clamps, other structural attachments), removing the vehicle from the calibration station (104), and performing field testing and verification of the recently calibrated ADAS features. The calibration management server (112) may enforce one or more steps of field verification by displaying visual aids, requiring acknowledgment by the local technician of performance of a step, and capturing photo, video, or sensor information associated with the performed step. As an example, during field calibration, the local technician device (108) may be configured to automatically capture video of the field test, to capture accelerometer data during a collision avoidance feature test, or to capture other information, and provide that information to the calibration management server (112) via the hub (106) to be stored and associated with the workflow.

Once all calibration and verification steps have been performed, the calibration management server (112) may complete (220) the transaction by generating calibration reports, field validation reports, invoices, and other information associated with the completed calibration and transmit them to one or more of the local technician device (108), the SIS (122), or a vehicle owner via their provided contact information. In some implementations, workflow enforcement may continue beyond this point, with the calibration management server continuing to track information and provide task requests through the payment of an invoice by a customer and the payment of any licensing fees or services to third parties providing functionality to the calibration system (e.g., such as where a per-use transaction fee is associated with using the vehicle identification interface (116) which is payable upon payment of a customer invoice associated with the identified vehicle).

II. Calibration Workflow Management

Figure 3:
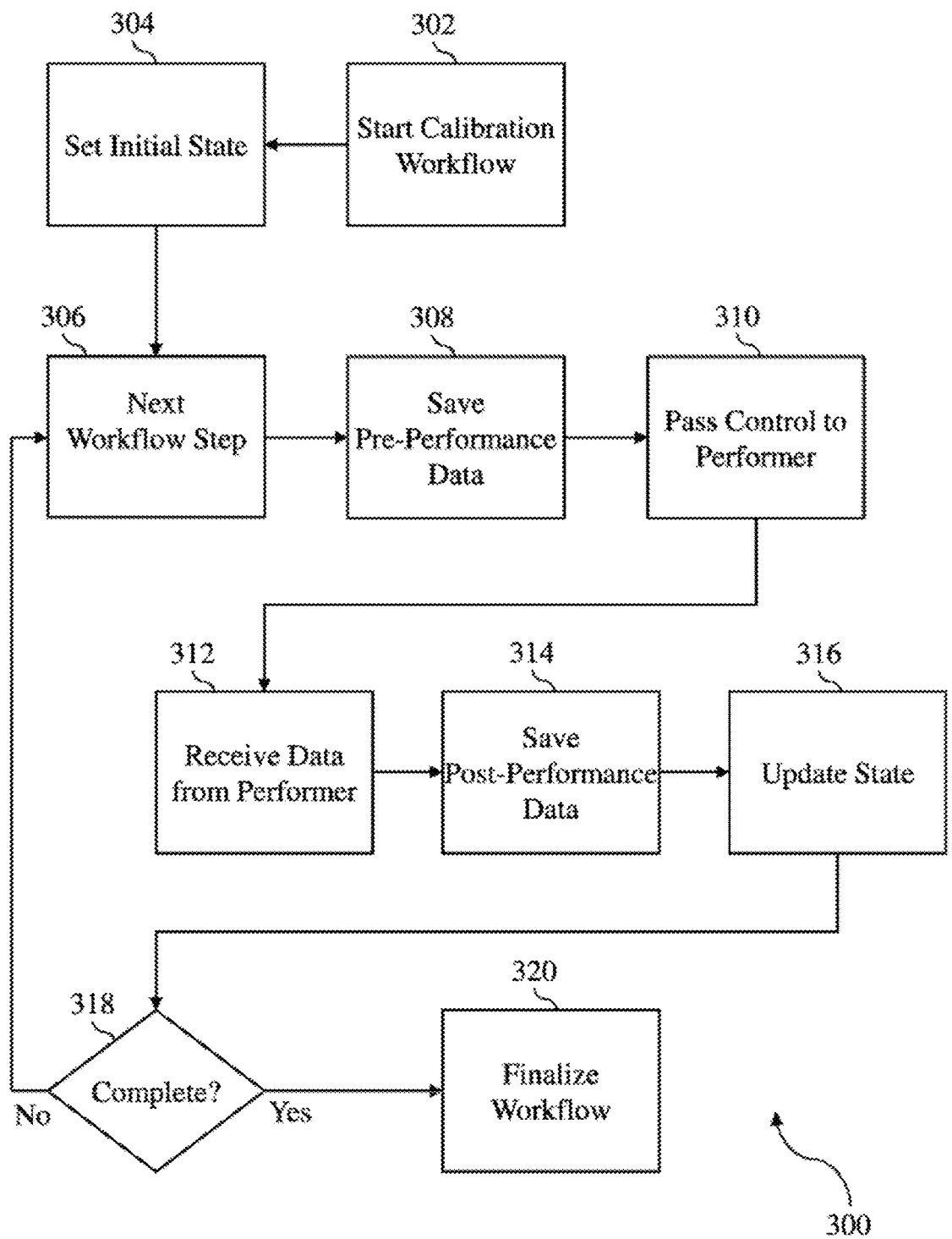
FIG. 3 is a flowchart showing an exemplary set of steps that may be performed to manage workflows for advanced driver assistance system calibration and repair.

A high-level description of workflow enforcement has been provided in the context of FIG. 2, but additional features and variations exist and will be apparent to those skilled in the art in light of this disclosure. As an example, FIG. 3 is a flowchart showing an exemplary set of steps (300) that may be performed to manage workflows for advanced driver assistance system calibration and repair using a process such as a state machine of the calibration management server (112). Initially, a calibration workflow may be started (302) by the state machine, which may occur in response to, for example, receiving (202) a calibration request as described in FIG. 2. From that point onward, the state machine may be configured to trigger and enforce the performance of each subsequent step, whether performed by an automated process or a local or remote technician. To manage this, the state machine may set (304) an initial state for the workflow, which initially may include basic information such as a VIN and a customer associated with the vehicle.

Each subsequent step of the workflow may then be iterated through in sequence or, where there are no dependencies to prevent certain steps, in parallel, until the workflow is completed in a manner that complies with the state machine's configured rules. As shown in FIG. 3, the state machine may identify or select (306) a next workflow step if it exists and is not delayed by a dependency, save (308) any pre-performance data associated with the step in order to update the state of the workflow, and then pass (310) control to the performer of that step. Pre-performance data that is saved (308) may include, for example, a description of the next (306) step, a performer associated with the step, an expected time within which the step will be completed, and other information that may be available prior to performance of the step, and that may be useful in later recreating or auditing the state of the workflow and/or the state machine at that moment in time. Passing (310) control to a performer of the workflow step may vary based upon the particular step but will generally include sending electronic information to a system or person in an expected and structured format.

One example of passing (310) control to a performer includes transmitting a VIN and other information to the vehicle identification interface (116) in order to identify (204) the associated vehicle. After sending the request, the state machine may regularly monitor for a response, while potentially also continuing to manage other steps that are not dependent upon the response from the vehicle identification interface (116). Another example of passing (310) control to a performer includes transmitting an electronic message to the local technician device (108) to notify a local technician of a task and workflow step that they are responsible for. Such a message may be in the form of a notification or alert indicating immediate and direct action, or it may be in the form of one or more task queues that are associated with a particular technician or associated with the local environment (110) itself, as will be described in more detail below.

In any case where the state machine has passed (310) control to a performer, a thread will continue to monitor the status of that performance until some sort of response data is received (312) from the performer or another source indicating a change in state to indicate completion, failure, acknowledgment, or some other response to control being passed (310) to the performer. Data may be received (312) multiple times before control is ceded by the performer; this may include data indicating acknowledgment of a task, initiation of a task, that a task has been delayed, completion of a task, and other data. As data is received (312), it may be regularly saved and added to the record of the workflow's state. When data is received indicating completion of the task or step for which control was passed (310), the state machine may save (314) any post-performance data associated with the task and then may update (316) the state of the workflow to reflect the completion of the workflow step. Post-performance data may include, for example, data associated with successful performance (e.g., a successful vehicle identification, a record of ADAS configuration changes during calibration), data associated with a failed or delayed performance (e.g., a cause of the delay, an error message), and other information that may be available after performance of the task, and that may advantageously be saved to aid in later review of the task's completion or failure.

Post-performance data that is saved (314) may also include user confirmations relating to the task. For example, where the task for which control was passed relates to positioning a vehicle on the calibration station (104), the calibration interface (108) may display a message upon completion of the task asking a user to verify that the vehicle position was compared to a positioning guide or other indicator to confirm that it is properly positioned. Such confirmation may be associated with the user from which it is received and for audit and accountability purposes may also include information such as the time and date of confirmation, biometric data (such as a user fingerprint or facial image captured at the time of confirmation via the calibration interface (108) or another device), GPS, and other data as will occur to those skilled in the art in view of this disclosure.

In some implementations, the post-performance data (314), pre-performance data (308), captured audio, video, or other data streams, user interface content, user input, and other data relating to tasks performed using the system are preserved indefinitely and associated with the vehicle to which they relate. In this manner, a repair history associated with a vehicle may be created that describes the state of ADAS calibration tasks performed on a vehicle. Information gathered during performance of tasks and associated with such a repair history may include, for example, vehicle VIN, ADAS module serial numbers and software versions, vehicle ECU software version, and pre-calibration and post-calibration ECU parameters relating to ADAS features and other systems. Such information may also include all calibration inputs and outputs, including feedback from ADAS and other vehicle systems prior to calibration, during calibration, and after calibration, confirmations from local and remote technicians of the performance of specific indicated tasks (e.g., confirmation of proper vehicle position, proper target position, etc.), actions taken by remote technicians (e.g., fine tuning of target positioning, calibration tasks), ADAS calibration tasks requested by a vehicle owner, error codes relating to calibration, sensor verification of proper target placement (e.g., such as by RFID verification of proper target placement, as will be described in more detail below), and other details. Such information may be accessible by querying the vehicle that is associated with, such that a user of the calibration system (100) may determine for any given vehicle what past actions were or were not taken related to ADAS calibration and repair.

When a step has been completed, the state machine may determine whether there are additional steps to complete (318) or whether the entire workflow has been successfully completed. Where additional steps remain, such as subsequent steps that are dependent upon recently completed preceding steps, the state machine may proceed to the next (306) workflow step. Where the state machine determines that all steps are complete (318), the state machine may finalize (320) the workflow, which may be associated with completing (220) the transaction as described in the context of FIG. 2. Finalizing (320) the workflow may also include discarding some intermediate data saved by the state machine that is of lesser value or relevance once the workflow has been successfully completed and committing other data for long-term storage to aid in later review of the workflow.

Figure 4:
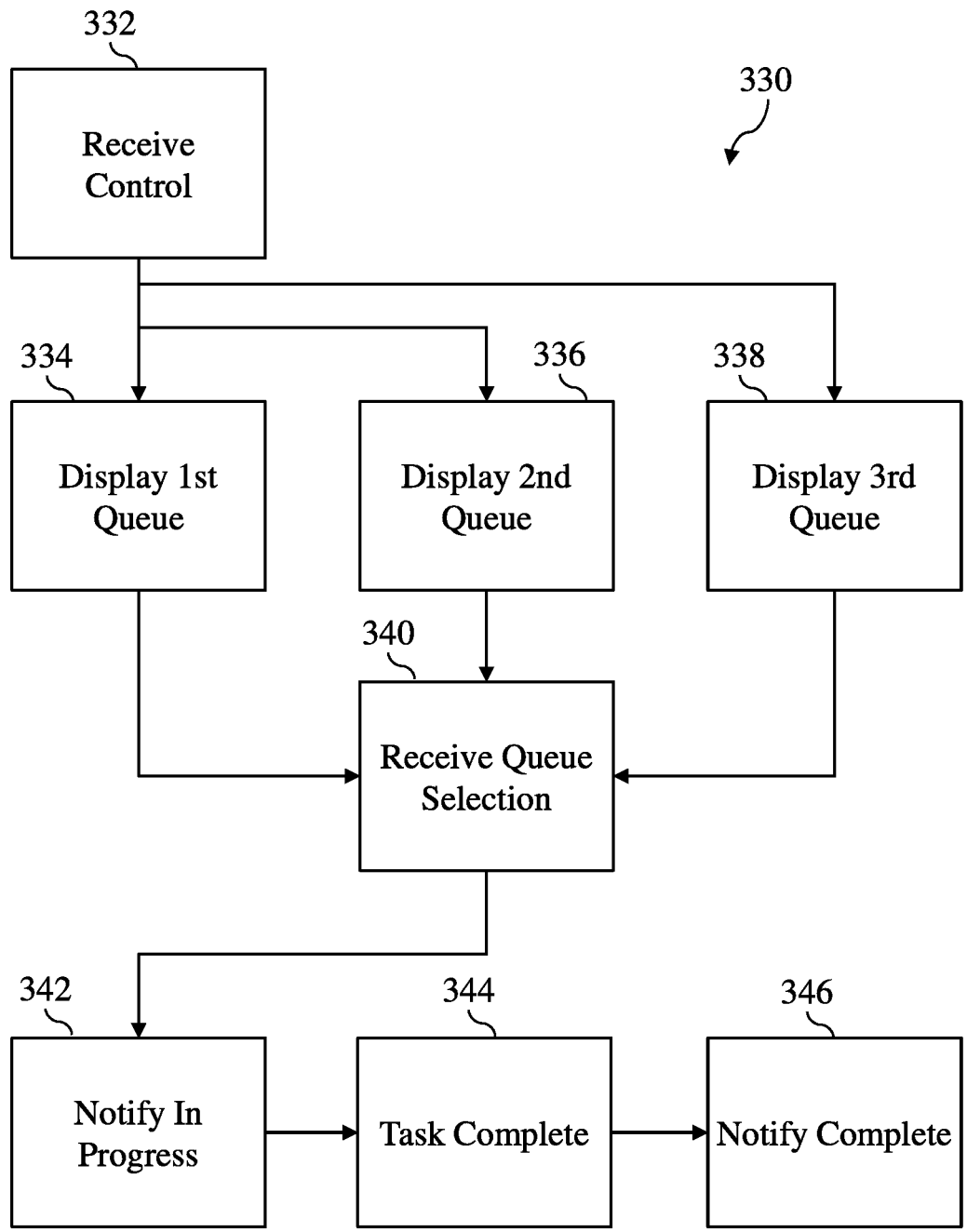
FIG. 4 is a flowchart showing an exemplary set of steps that may be performed to allow a user to interact with a workflow.

As has been described, the state machine may enforce workflow related to ADAS calibration by passing control to performers that are configured for or associated with certain tasks and steps of a workflow. As an example, FIG. 4 is a flowchart showing an exemplary set of steps (330) that may be performed to allow a user such as a local technician or a remote technician to interact with the state machine. A local technician may interact with the state machine via the local technician device, while a remote technician may receive data via the remote technician device (118), which may then be displayed via a web interface or a device similar to the local technician device (108) used by the local technician.

Whenever the state machine passes (310) control for a particular task to a person, data indicating control of that task may be received (332) by a device associated with the performer (e.g., the local technician device (108) or another device) and used to display an interface describing the task. While the state machine maintains master records relating to workflow tasks and state, such information may be pushed out to devices involved in the workflow to aid in guiding and enforcing the workflow. Thus, data received (322) by the local technician device (108) is a copy of the master record and is only used locally to aid a person associated with the device in performing the task for which they have control. If that particular device is lost, damaged, or the data is otherwise lost or corrupted, the state machine still preserves a master record. This is advantageous in that control for that task may then be passed (310) to a different device or person if needed. The state of that task will also be current as of the last time that data was received (312) from the performer, meaning that in many or most cases the new party in control of the task may continue the task from a state of partial completion if necessary.

In some implementations, tasks may be assigned to performers on a one-to-one basis, such that any single performer only has one task at a time for which they have received (332) control. However, in other implementations, a single performer may have control for multiple tasks. In such cases, data associated with tasks may be organized into one or more queues for display on the local technician device (108), as shown in FIG. 4. That example assumes that the local technician device (108) is configured to display three separate queues of tasks. In the case of a local technician, a first queue may be associated with pre-positioning of vehicles, a second queue may be associated with local-remote calibration of a vehicles, and a third may be associated with field validation of recalibrated vehicles, as an example.

A user such as a local technician or a party responsible for assigning tasks to a local technician may use the local technician device (108) to display information related to tasks for which they have been assigned control, which may include receiving information and displaying (334) the first queue, receiving information and displaying (336) the second queue, and receiving information and displaying (338) the third queue. Each queue may be displayed in a software interface, either simultaneously or selectively, and may be viewed and interacted with by a user. Tasks may be selected from one of the queues in order to designate that task as one that has begun. When such a queue selection is received (340), the local technician device (108) may communicate with the state machine to indicate that the selected task is now in progress (342) and may provide additional information such as the time of selection and the user who is performing the task.

When the task is completed (344), the local technician device (108) may be used to indicate that the task is complete. In some implementations and with some workflow tasks, a party or device other than the person performing the task may provide the indication of completion, such as where a remote technician collaborating with a local technician marks a task as complete, or where a software process automatically marks a task as complete based upon sensor data. In either case, data may be provided to the state machine indicating completion (346) of the task and may also include data indicating the device or party indicating completion of the task and data related to the performance and/or completion of the task. As the state machine receives information indicating completion of a task, such information may be used to update state data related to the workflow and task, and to build and distribute updated queues for display by the local technician device (108).

Figure 14:
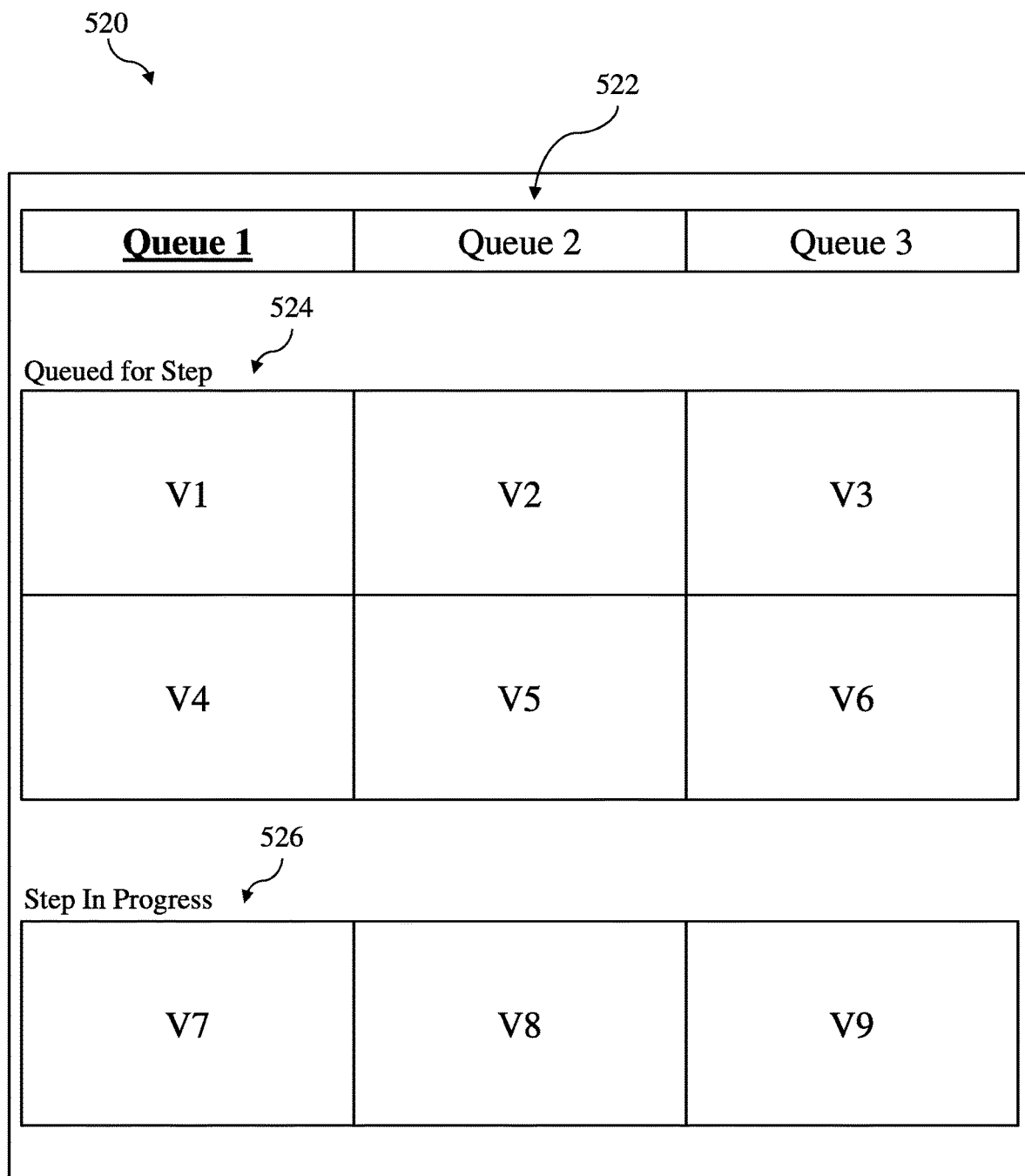
FIG. 14 illustrates a workflow queue interface that may be provided by the calibration and repair system of FIG. 1.

FIG. 14 illustrates a workflow queue interface (520) that may be used by local or remote technicians to view and interact with tasks for which they have been given control. A technician may interact with queue selection (522) to view and switch between various queues. A waiting queue (524) may display information on a plurality of vehicles that are awaiting performance of a task. Each of the individual vehicle sections may be interacted with to view additional information or mark a particular queued task as in progress. A progress queue (526) may display information on a plurality of vehicles for which the task is currently being performed, and each vehicle section may be interacted with to view additional and mark a particular in progress task as complete. The workflow queue interface (520) may be displayed on the local technician device (108) and may be associated with and used by a single local technician specifically associated with that local technician device (108), or it may be associated with and used by a supervisor to assign queued tasks to individual technicians.

Figure 8:
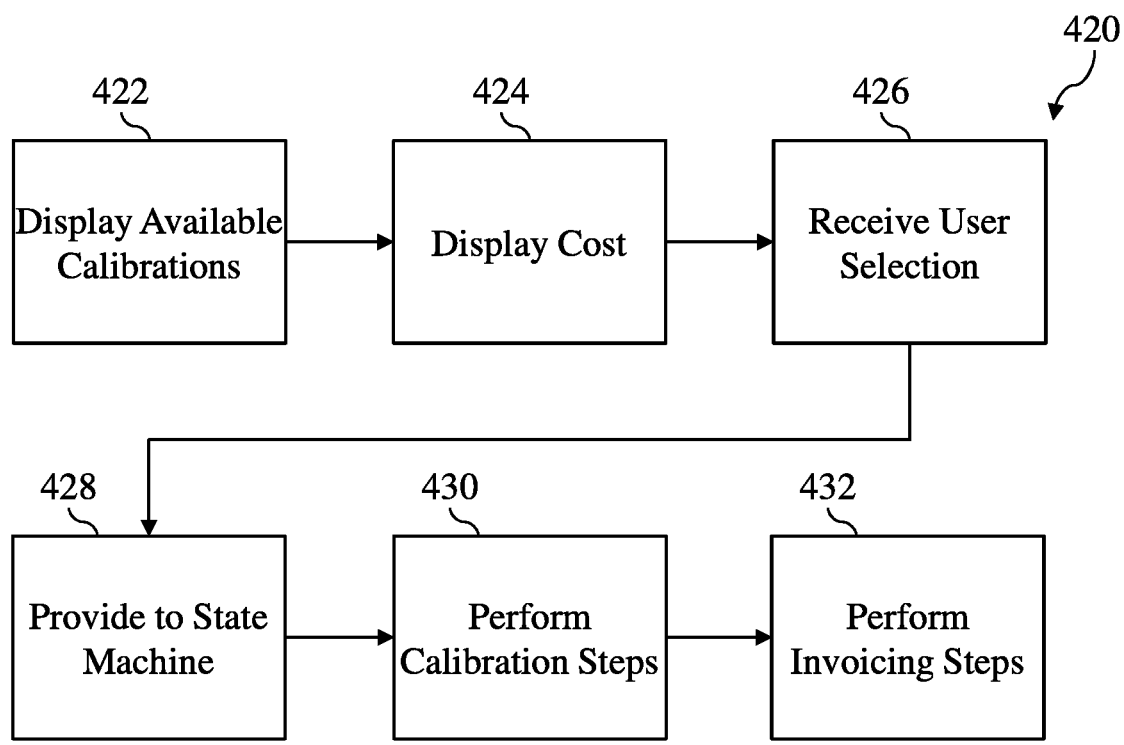
FIG. 8 is a flowchart showing an exemplary set of steps that may be performed to provide pay per use functionality with the calibration and repair system of FIG. 1.

As another example of a feature that may be supported by the state machine and described above, FIG. 8 is a flowchart showing an exemplary set of steps (420) that may be performed to provide pay-per-use functionality with the calibration system. One or more of the steps (420) may be performed with the local technician device (108), the SIS (122), or a customer-facing computing device. The configured device may display (422) one or more ADAS calibration tasks available for a particular vehicle, such as described in relation to validating (210) the availability of ADAS feature on a vehicle in FIG. 2. The device may also receive information indicating the costs associated with the one or more ADAS calibration tasks, which may be provided by the calibration management server (112), and display (424) costs associated with each task. A user selection may be received (426) that indicates one or more of the calibration tasks that are to be performed. The received (426) selection may be provided (428) to the state machine of the calibration management server (112) as has been described.

After control for the task has been returned to the state machine, the state machine may perform subsequent assignment of workflow tasks resulting in the performance (430) of the selected calibration tasks and any subsequent field verifications or other testing, as well as tasks relating to invoicing (432) to a customer, receiving payment from a customer, and paying any license or software use fees associated with the workflow.

Figure 9:
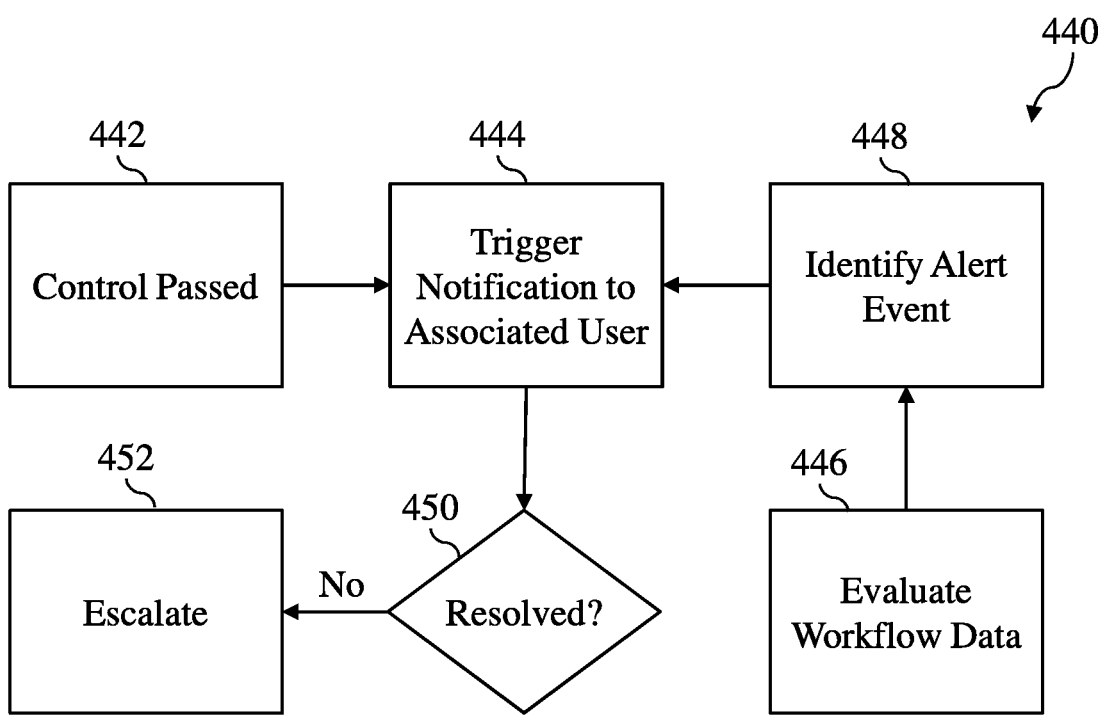
FIG. 9 is a flowchart showing an exemplary set of steps that may be performed to provide workflow and event notification with the calibration and repair system of FIG. 1.

As another example of a feature that may be supported by the state machine and described above, FIG. 9 is a flowchart showing an exemplary set of steps (440) that may be performed to provide notifications relating to workflow management. Such steps may be performed by the state machine as a portion of the calibration workflow itself, or they may be performed in a parallel process that monitors for certain events and conditions, or both.

As an example, the state machine may be configured, as part of passing control (442) to a person or system, to trigger a notification to one or more users associated with that person or system. This may include notifying a person who received control of the task as well as their supervisor or notifying an administrator of a system that received control of the task, for example.

As another example, the state machine or another process of the calibration management server (112) may be configured to regularly evaluate (446) workflow data across the system, rather than focusing on enforcing the sequence and performance of tasks for a particular workflow. This may include evaluating (446) data associated with a plurality of workflows and a plurality of local environments as well as evaluating data that typically falls outside the normal calibration workflow, such as diagnostic messages and status information from devices such as the hub (106) or the local technician device (108). During the evaluation (446), the calibration management server (112) may be configured to identify (448) one or more events that are associated with an alert condition, which may include, for example, a set of network traffic data or network errors originating from a particular hub that indicates it is not reliably communicating with the calibration management server (112). Where an alert event is identified, a notification may be triggered (444) to one or more users associated with the event or the system or device that the event relates to.

In either case, after providing a notification (444) to one or more users, the calibration management server (112) may monitor for a response indicating that the notification was received and/or resolved (450). Where no such response is received after a configured period of time, the calibration management server (112) may escalate (452) the notification or alert by notifying additional users (e.g., supervisors or alternate contacts).

III. Remote Calibration of ADAS

Figure 5:
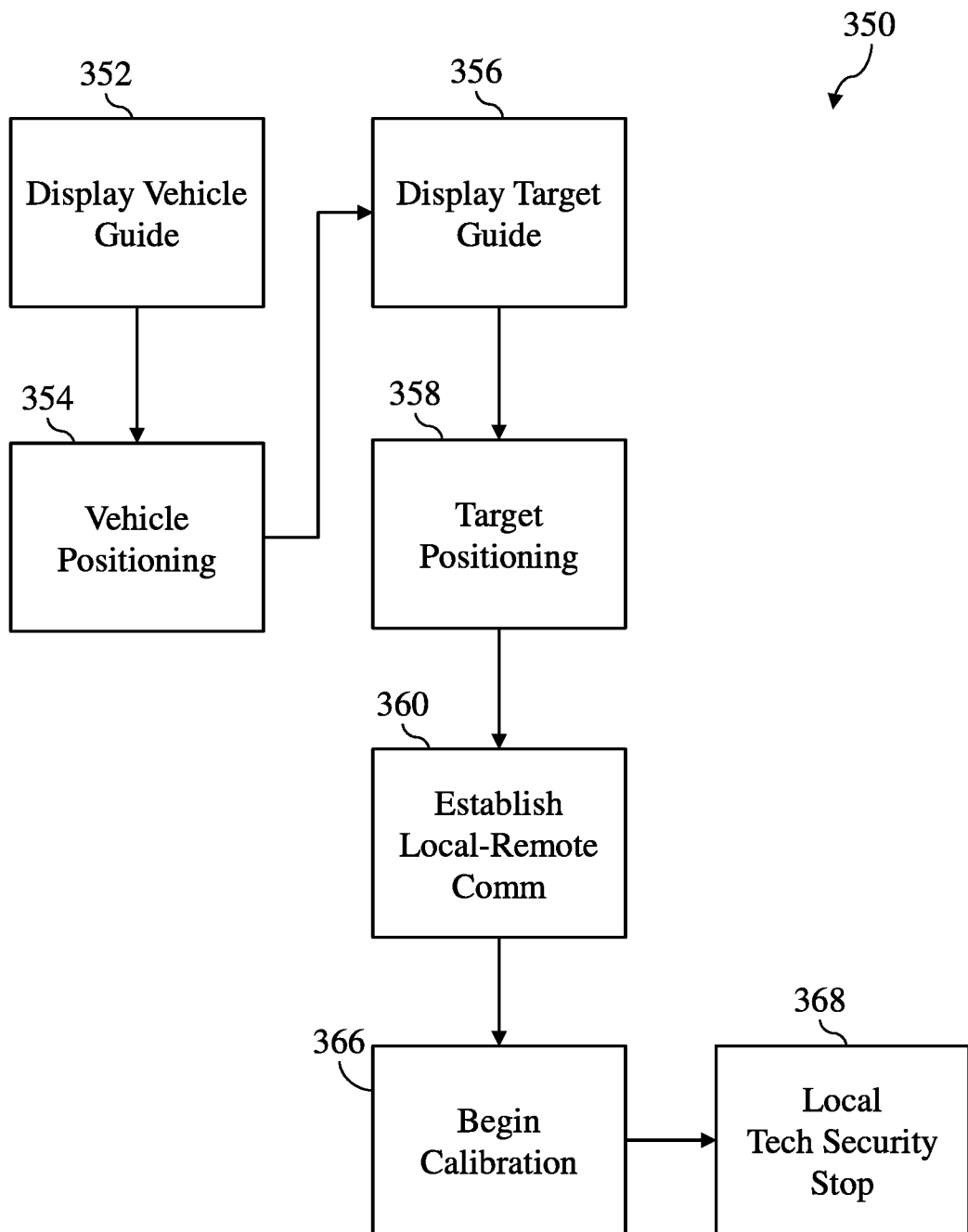
FIG. 5 is a flowchart showing an exemplary set of steps that may be performed to coordinate calibration of advanced driver assistance systems by remote and local technicians.

While the features and workflow related to remote collaboration, or local-remote calibration, have been described in some detail, additional variations exist and will be apparent to one skilled in the art in light of this disclosure. As an example, FIG. 5 is a flowchart showing an exemplary set of steps (350) that may be performed to coordinate calibration of ADASs between a local and a remote technician. In some implementations, the steps of FIG. 5 may be performed in relation to the steps shown in FIG. 2 beginning with vehicle pre-positioning (206) and ending after local-remote calibration (216).

As vehicle pre-positioning (206) begins, the local technician device (108) may be configured to automatically display (352) a vehicle guide to the local technician to aid in positioning. The vehicle guide may also be displayed when the position of the vehicle is fine-tuned or repositioned after the pre-positioning (206) step, such as where the remote technician is concerned with the vehicle's location prior to calibration. With the vehicle guide as a reference, the local technician may position (354) the vehicle relative to the calibration station (104) while the local technician and/or remote technician view information (e.g., sensor data, images, video) to verify the position. Once positioning (354) is complete, the local technician and/or remote technician may confirm the position, which may result in that workflow step being finalized and passed back to the state machine as complete, as has been described.

During remote-local calibration, the local technician device (108) may also display (356) a target guide to the local technician and/or the remote technician to aid in positioning of the target surface relative to the vehicle (102). With the target guide as a reference, the local technician and/or remote technician may fine-tune (358) the position of the target surface. During target positioning (358), the local technician device (108) may also display other information (e.g., sensor data, images, video) to aid in positioning. In addition to displaying vehicle positioning and target positioning guides and related information from sensors or cameras on the local technician device (108), the calibration management server (112) may also transmit such information to the remote technician via the remote local technician device (118) so that it may also be displayed to the remote technician. In this manner, each of the local and the remote technician may, if desired, view and access substantially the same datasets during local-remote calibration of the vehicle.

In some implementations, target positioning (358) may be fully or partially automated based on vehicle type, sensor feedback, or other factors. This could include, for example, automated target positioning (358) in response to a user of the calibration interface (108) or the remote technician device (118) providing the vehicle VIN number, model information, or other identifying information. Such information may be used to retrieve information describing position coordinates of targets for various calibration tasks for that type of vehicle, which may be provided to the calibration station (104) to cause automated positioning (358) of one or more targets based on that specification. Automated positioning (358) may be combined with displaying (356) the target guide so that users (e.g., either a local technician who is physically present, or a remote technician viewing via video) may confirm or fine-tune the target positions after automated positioning (358).

In some implementations, the process of target positioning (358) may provide additional feedback to aid a local or remote technician in proper positioning. For example, this could include providing calibration targets with RFID identifiers, optical identifiers, or other unique and potentially machine-readable identifiers that correspond to a reading device (e.g., an RFID transceiver, optical reader, or other device capable of receiving data) on a structure to which the calibration target is mounted. In such an implementation, mounting a correct calibration target (e.g., a target of the proper size, surface finish, and other characteristics for a specified ADAS calibration and vehicle) to a structure of the calibration station (104) may result in a visual indication of proper mounting, while an incorrect calibration target may result in a visual indication of improper mounting. The visual indication may be, for example, an indicator of one or another color, shape, size, or sound on or from the calibration station (104), or a software interface or notification presented via the local technician device (108) or the remote technician device (118). Indications of improper mounting may be paired with display (356) of the target guide and may additionally provide an image or other description of the proper calibration target which should be mounted.

The calibration management server (112) may also be configured to establish (360) one or more real-time communication channels between the local and remote technicians, which may include one or more of text chat, video chat, and audio chat via the local technician device (108) and the remote technician's corresponding device. Local-remote communication may be established (360) automatically at the appropriate step of the workflow, on an as-needed basis, or in response to a request by one of the technicians (e.g., clicking a button or other interface feature).

The calibration management server (112) may then begin (366) the calibration process, which may include transmitting diagnostic data from the vehicle (102) to the remote technician and providing calibration and configuration changes from the remote technician to the vehicle (102). Calibration may also include repositioning of the vehicle and/or target surface during various stages, such as where the vehicle (102) includes ADAS features for forward collision as well as rear collision. During manual or automatic positioning of the target surface, the local technician device (108) may allow the local technician to immediately halt (368) automated movements if they perceive any potential danger in the vicinity of the calibration station (104).

Figure 12:
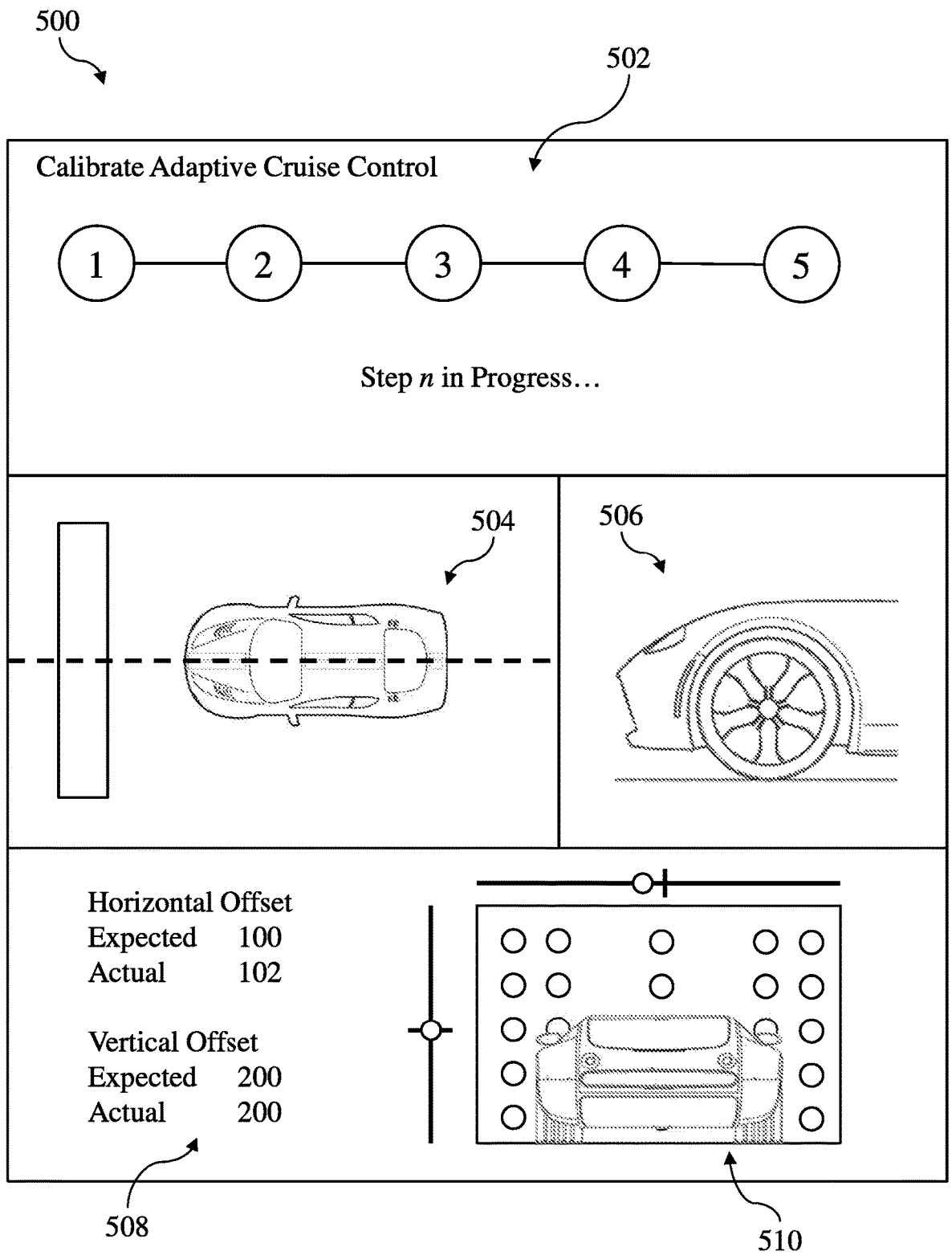
FIG. 12 illustrates a first exemplary coordination interface that may be provided by the calibration and repair system of FIG. 1.
Figure 13:
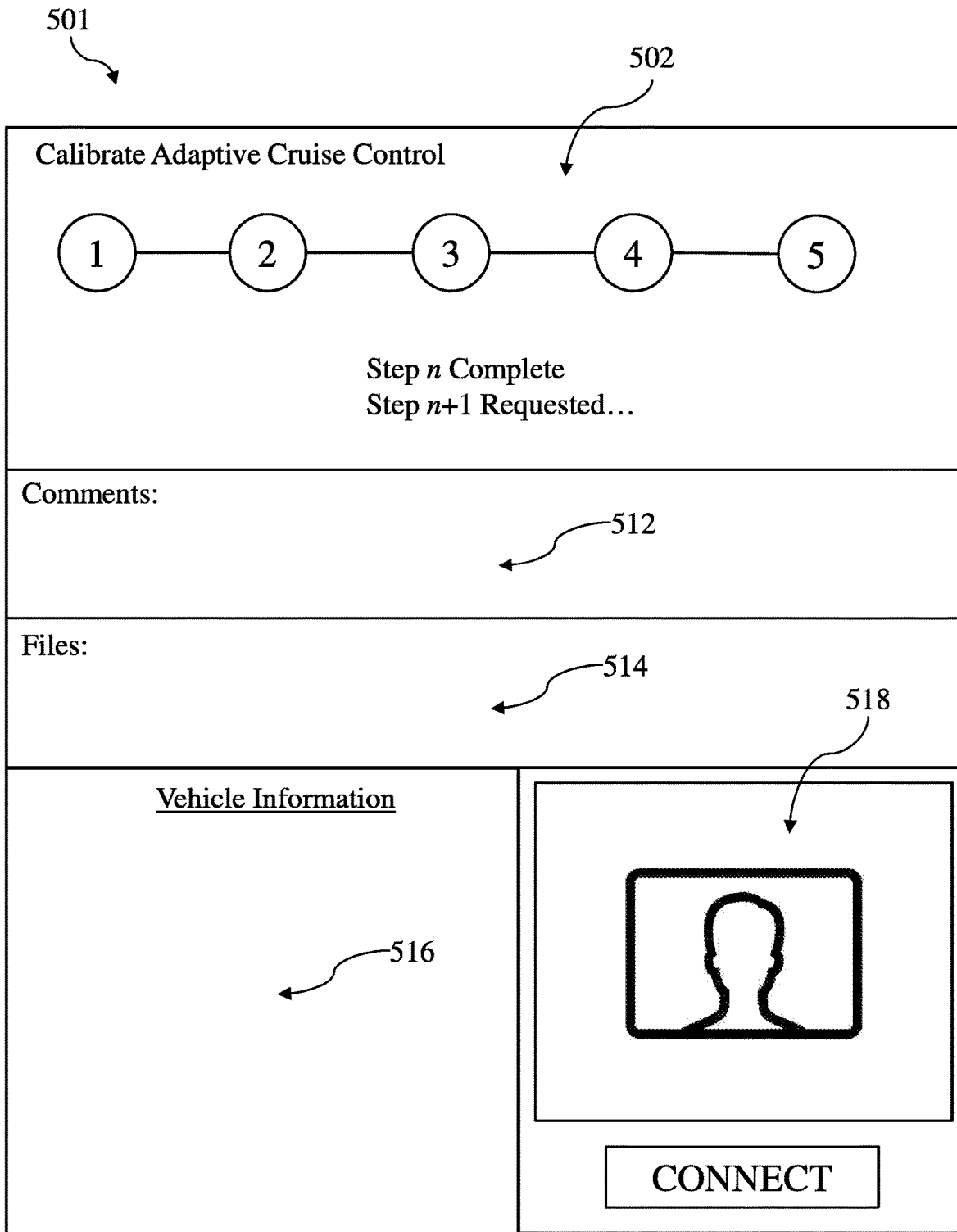
FIG. 13 illustrates a second exemplary coordination interface that may be provided by the calibration and repair system of FIG. 1.

FIGS. 12 and 13 each illustrate an exemplary interface that may be displayed on the local technician device (108), the remote technician's corresponding device, or both. FIG. 12 illustrates an interface (500) that may be used during positioning of the vehicle (102) relative to the calibration station (104), positioning of the target surface, or both. The interface (500) includes a workflow guide (502), which may show a set of precedent and/or subsequent workflow steps related to the current task and may also visually or textually indicate a current workflow step that is being performed. A vehicle guide (504) is also shown, such as described in relation to displaying (352) the vehicle guide in FIG. 5. The vehicle guide (504) may include illustrative diagrams showing general information related to positioning a vehicle on the calibration station (104) and may include additional information such as sensor feedback (e.g., depth sensor feedback indicating the vehicle is misaligned) or captured images from a camera (e.g., a top-down view captured from a camera above the calibration station (104) with a midline and/or other visual markers overlaid upon the captured image).

A wheel alignment guide (506) is also shown, which may include illustrative diagrams, sensor feedback, or image capture related to the current alignment of the vehicle's (102) wheels. During many calibration tasks, the vehicle's (102) wheels should be substantially centered. Depth sensors may provide an indication of the wheel's alignment while captured images may allow for visual inspection. The wheel alignment may also be available via the diagnostic scanner (124), where the vehicle ECU tracks steering wheel and/or front wheel angle.

A target guide (510) is also shown and may include illustrative diagrams, sensor feedback, or captured images related to the position of the target surface relative to the vehicle (102). The target guide (510) may be shown during target positioning (358), during calibration, or both. An offset indicator (508) is also shown, which may include various offset information related to the target surface area's position relative to the vehicle during various ADAS calibration tasks. For example, a curb sensor may require that the target surface be positioned low to the ground, while a forward collision sensor may require that the target surface be positioned several feet above the ground. In such cases, the offset indicator (508) may be used to aid the local and remote technician in fine-tuning the position of the target surface. In various embodiments, the offset information displayed by the offset indicator (508) may be provided by the ADAS calibration equipment or other components as will occur to those skilled in the art in view of this disclosure.

FIG. 13 illustrates an interface (501) that may be displayed after establishing (360) local-remote communication between the technicians. The interface (501) may include the workflow guide (502), and may also include a comment log (512) where comments relating to the calibration may be documented and shared between parties, a file section (514) where files (e.g., images captured by the local technician, calibration specification documents) may be shared between parties, a vehicle information section (516) where various information relating to the vehicle (102) that is being calibrated may be displayed, and a chat section (518) that may allow the local and remote technicians to connect via video chat, audio chat, or text chat during calibration.

IV. Calibration and Repair System Security Features

A high standard for data security and integrity are important for the calibration system (100) due to the sensitive customer data that may be available within the system, the value of calibration specifications and other data and software used during calibration, and the risk of bad actors attempting to corrupt or modify ADAS calibrations to cause the features to perform unpredictably or dangerously.

Figure 6:
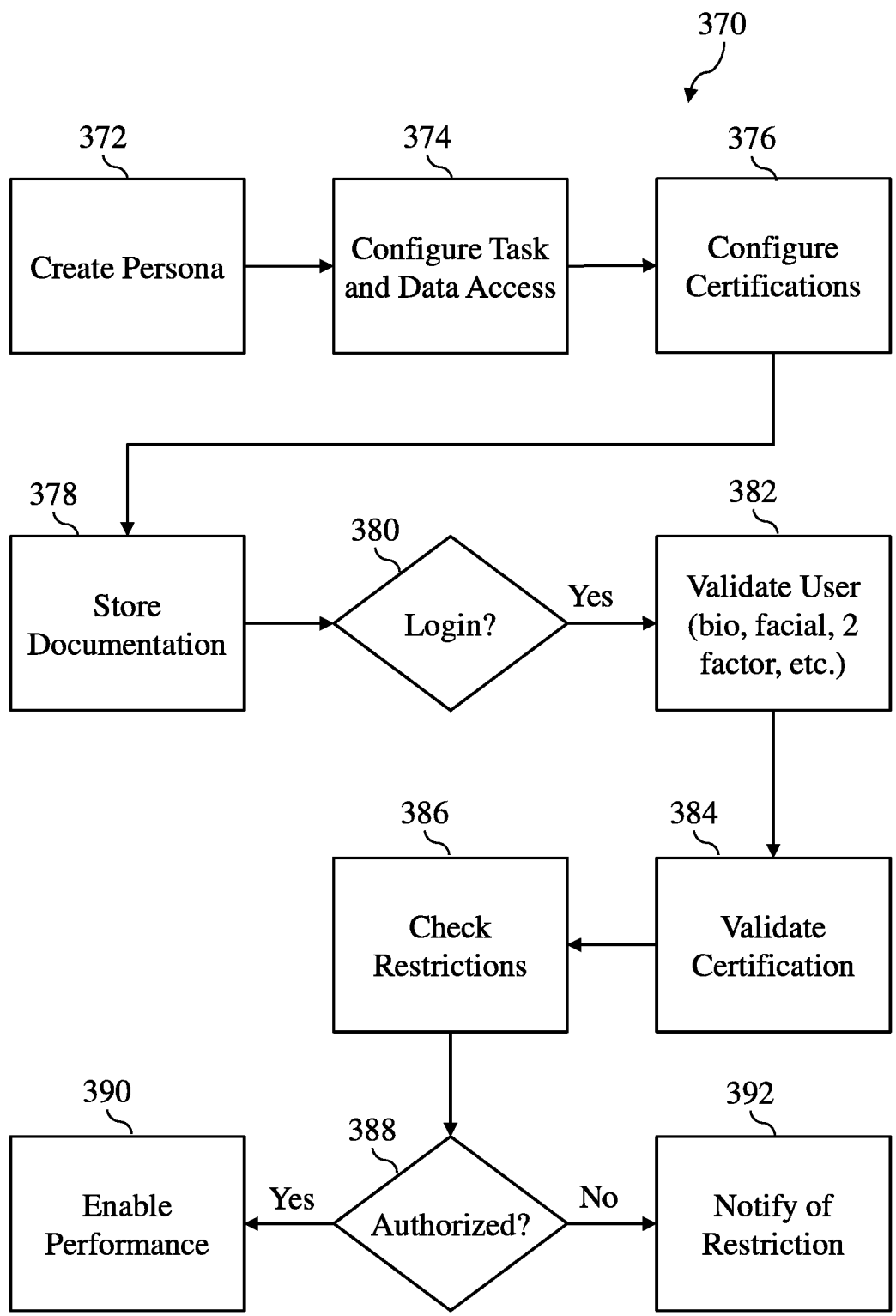
FIG. 6 is a flowchart showing an exemplary set of steps that may be performed to authorize user interactions with a workflow.

One advantageous feature of the calibration system (100) is strict enforcement of user authorization for users who are participating in the workflow. As an example, where a user requests to participate in the performance of a task (e.g., such as by selecting a task from a task queue), part of the workflow for assigning control of that task to the user may include verifying the user for valid performance of the task. As an example, FIG. 6 is a flowchart showing an exemplary set of steps (370) that may be performed to authorize user interactions with the state machine and calibration management server (112). When a user is first configured as a task performer for the state machine, a persona may be created (372) that includes various information about the user such as their name and the company they work for (e.g., remote technicians and local technicians may have different employers). Access to certain tasks and certain data may also be configured (374) for the user and may be configured manually, may be configured automatically based on a property of the user's persona (e.g., their employer), or both.

A user's certification and qualifications may also be configured (376) and associated with their persona. Such information may be manually configured or may be automatically configured or retrieved such as by communicating with the user authorization interface (114). Enforcement of qualification, certification, and expertise of users by the state machine as control for tasks is being granted allows the system to ensure in real time that tasks are properly assigned and performed by qualified technicians. The user persona may also be associated with various documentation (378) relating to the user, which may include electronic copies of certification and training records, privacy policies and other agreements that the user has agreed to abide by while working on customer vehicles, and other similar information that may be useful in later auditing or reviewing the performance of work for customers.

Once a persona is configured for a user, that user may login (380) to the system one or more times per day or per shift as may be desirably configured by providing a username and password or other authentication. The user authorization workflow may also require additional steps to validate (382) the user at login, which may include biometric capture and verification (e.g., fingerprint, ocular, or facial scan), multi-factor authentication, or other methods. The user authorization workflow may also validate (384) a user's current certification, licensure, and/or training level upon login or at each time that a workflow task is potentially assignable to the user, to verify that they are authorized for that particular task. This may prevent a user from unknowingly performing a task that they are not certified for such as where a previous certification or license has expired or where a new certification requirement has been recently added.

The user authorization workflow may also check (386) for any restrictions that have been associated with the user. User restrictions may be configured for a user as a disciplinary measure or in response to poor performance on certain tasks. Where the user is fully authorized (388) for a certain task for set of tasks based upon prior steps, the state machine may enable (390) the user to perform the task and pass control of the task to that user. Where some issue with the user is identified such that they cannot be authorized (e.g., a restriction flag or an expired certification), the user may be prevented from receiving control for the task, and a notification (392) may be provided to the user and/or their supervisor identifying the issue.

Figure 10:
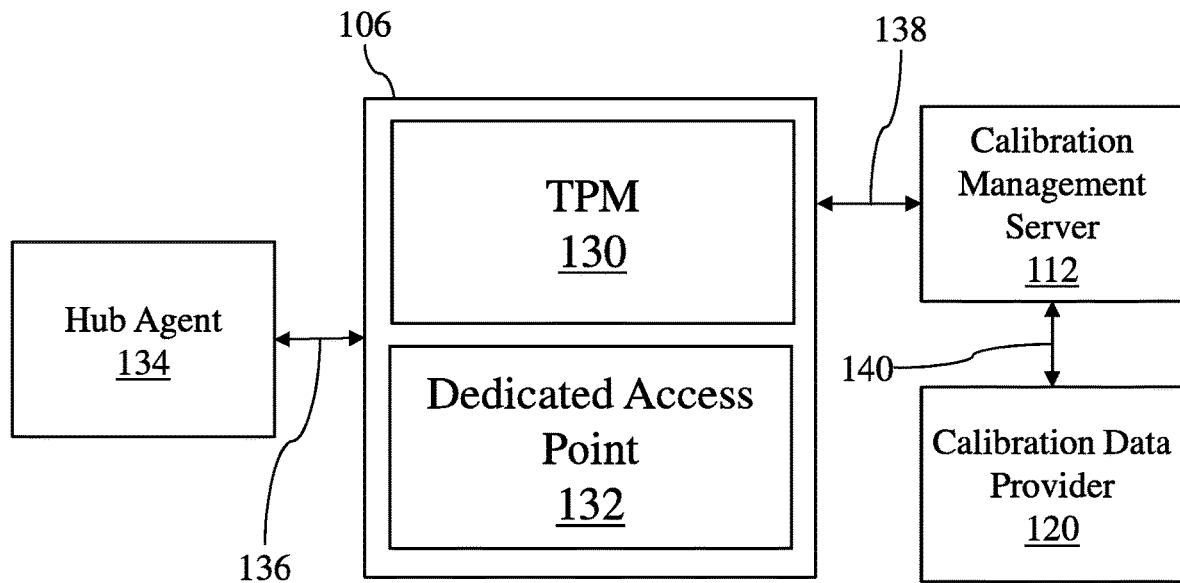
FIG. 10 is a flowchart showing an exemplary security configuration for the calibration and repair system of FIG. 1.

The hub (106) implementation is another advantageous security feature of the calibration system (100). For example, FIG. 10 is a schematic diagram showing an exemplary hardware and software configuration of the hub (106). The illustrated hub (106) includes a trusted platform module ("TPM") or other hardware security module that allows for data such as security and encryption keys to be stored locally on the hub (106) while resisting tampering with or access to such information. The hub (106) also includes a dedicated access point (132) that may be configured to provide a wireless network in the local environment (110) that restricts access only to preconfigured devices, as has been described. The wireless network provided by the dedicated access point (132) may additionally be configured to obfuscate its wireless network identifier so that it does not appear to basic wireless network scanning. Each device connecting to the hub (106) may be configured with a hub agent (134) that is required for communication. In this manner, establishing local connections (136) between the hub (106) and devices in the local environment (110) in this embodiment requires both specialized software, such as the hub agent (134), as well as network identifiers, passkeys, encryption keys, and other information that is required to add new devices to the hub (106), but that does not need to be shared with the parties that maintain the local environment (110). The result is a secure and predictable network in the local environment (110) that will be highly resistant to attempts at modification or manipulation.

Similarly, a remote connection (138) between the hub (108) and the calibration management server (112) may be implemented using features such as SSL or VPN, or hard-coded MAC address configuration to ensure point-to-point communication with preconfigured hubs (108) while preventing communication between the hub (108) and other devices in the wide area network. Digital signatures, encryption keys, and other data required to communicate over the remote connection (138) may be stored on the TPM (130), which may be configured to resist attempts to access or temper with the data by locally encrypting or destroying the data in response.

The calibration management server (112) may communicate with other devices in the wide area network, such as the calibration data provider interface (120), over an external connection (140). The external connection (140) may be configured similarly to the remote connection (138) and so may provide a high level of security and predictability in communications between the calibration management server (112) and devices external to the trusted network.

Figure 11:
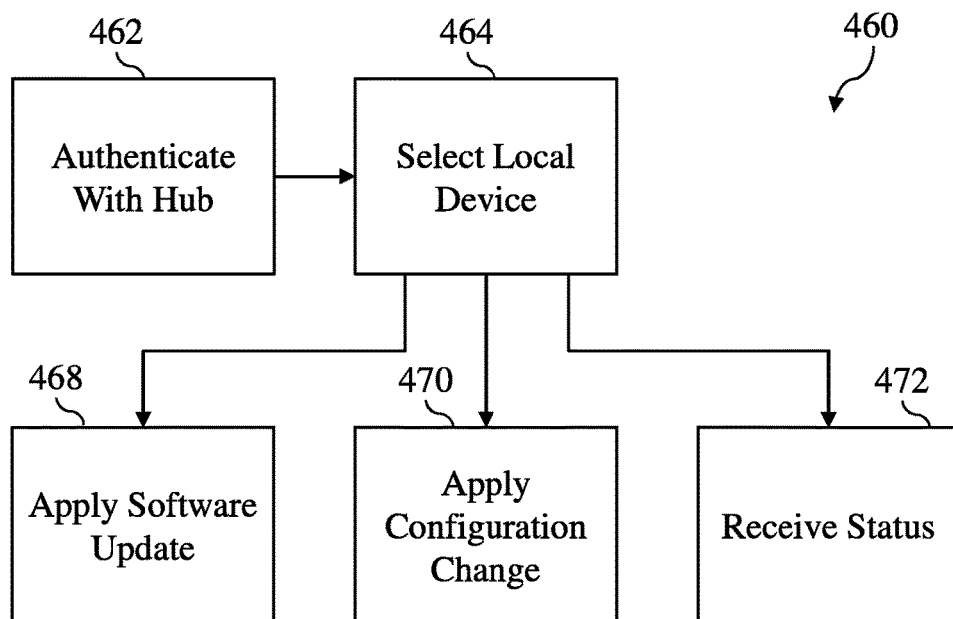
FIG. 11 is a flowchart showing an exemplary set of steps that may be performed to provide remote management of the calibration and repair system of FIG. 1.

Another advantageous security feature of the calibration system (100) is shown in FIG. 11, which is a flowchart showing an exemplary set of steps (460) that may be performed to provide remote management of the hub (106) and other devices in the local environment (110). By allowing remote management of such devices from the calibration management server (112), the hub (106) and dedicated network in the local environment (110) may be maintained such that it is mostly invisible to technicians and others present in the local environment (110) while still allowing the software to be configured, updated, and maintained as security vulnerabilities are identified or improved security measures are developed.

Remote management of devices in the local environment (110) requires initial authentication (462) of the hub (106) via the remote management server (112) using secret keys, encrypted tokens, cryptographic authentication techniques, or other methods as will occur to those skilled in the art in view of this disclosure. Once authenticated, the remote user may select (464) a device connected to the hub (106), such as the diagnostic scanner (124) or local technician device (108). Once the selected (464) device is verified to be in communication with the hub (106), the remote user may perform various functions remotely, such as applying (468) software updates to update the firmware or software of the device, applying configuration changes (470) to change software settings or network settings of the device, or accessing and receiving (472) status information from the device, such as diagnostic information, error messages, access or audit logs, and other information, allowing the software to be configured, updated, maintained, and monitored.

In this manner, a plurality of hubs and locally connected devices may be monitored, updated, enabled and disabled, and otherwise administered remotely without the involvement (or even awareness) of technicians and others located in the local environment (110).

In some implementations, devices installed at a site (e.g., such as those shown in FIG. 1) may be installed with firmware, software, and configurations set at a factory location prior to installation. These devices may include, for example, the calibration station (104) (e.g., an automated target positioning system), the local technician device (108), and the hub (106). As new programming updates and configurations become available, such devices may be updated remotely and securely.

As one example, new updates and configurations may be loaded to a server such as the calibration management server (112) and, using a secure transport mechanism with encryption, be transmitted over the internet to the hub (106) at the local environment (110). The hub (106) may decrypt the contents and may verify the software integrity through checksum and other means. Software agents (e.g., hub agent (134)) present on the hub (106) may act as proxies for the devices and communicate with the devices to configure and update the firmware or software. Agents may be configured to update the hub (106) or themselves, update the target positioning system or other aspects of the calibration station (104), update the local technician device (108), or update other devices. In this manner, the calibration system (10)) may allow for verification of software integrity before changes are allowed, and it may also allow secure transmission and updating of software, firmware and other configurations.

V. Automated Calibration Specification Intake

Figure 7:
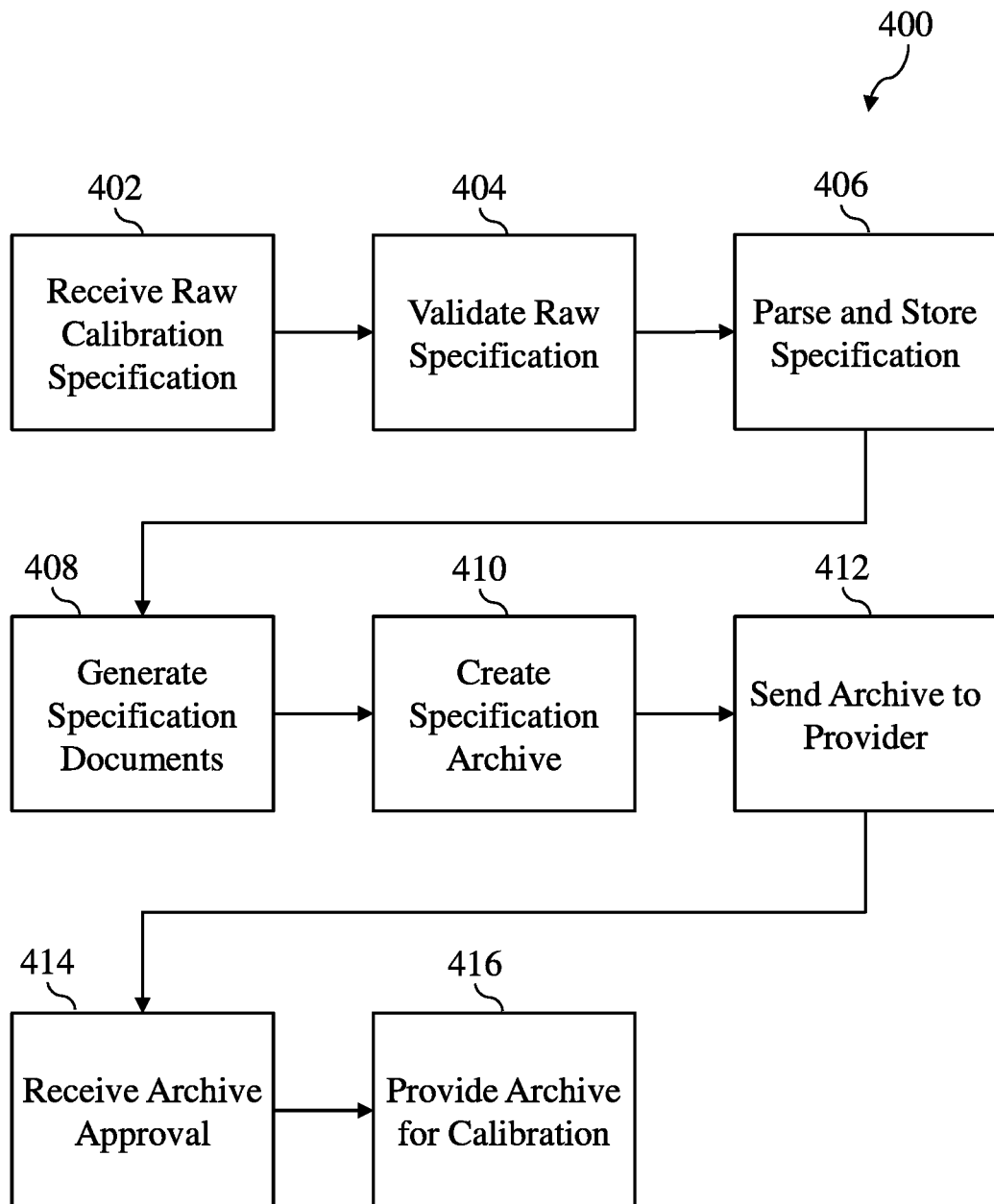
FIG. 7 is a flowchart showing an exemplary set of steps that may be performed to provide calibration specifications to the calibration and repair system of FIG. 1.

The calibration system (100) may advantageously allow for the automated and dynamic intake of new and updated calibration specifications, as has been described. As an example, FIG. 7 is a flowchart showing an exemplary set of steps (400) that may be performed to automatically add calibration specifications to those available to the calibration system (100). Calibration specifications may be provided by OEM sources and may be similar or identical to those used to calibrate ADAS features during their original manufacture or may be provided by third-party calibration specialists who develop them through experimentation.

The calibration system (100) may be configured for automatic intake of new and updated calibration specifications by implementing strict formatting and organizational requirements for the submitted specifications. Well-formed specifications that are submitted may then be automatically verified, parsed, and added to the system for immediate use.

Calibration specifications may be submitted as a set of raw documents, organized into a specific file structure depending upon their type and contents, and archived into a single file with a metadata description (e.g., a spreadsheet, XML document, or set of comma-separated values) that describes the type and contents of the archive. Data providers may be provided a software application that is configured to automatically organize and archive raw input files and generate the associated metadata files.

Once received (402), the raw calibration specification may be automatically validated (404) to ensure that it is well-formed based upon the file structure organization requirements and metadata. If valid, the received (402) raw calibration may be automatically parsed (406) and its component files and data stored by the calibration management server (112) in a strongly typed format. The parsed specification data may then be used to generate (408) documents appropriate for view and use via the local technician device (108) and the remote technician's corresponding device during vehicle calibration. For example, generated (408) documents may be PDF documents, HTML documents, and other document types that may be well-defined. Once generated, the new specification files may then be archived (410) into a new specification file that is associated with its own file structure and organizational rules.

The specification archive may then be automatically transmitted (412) to the original data provider, who may review the generated file and its contents to verify that the raw specification was successfully parsed and generated into the new format. After receiving (414) approval from the data provider, the newly generated archive may be distributed (416) to local environments (110) and local technician devices (108) on demand or as part of scheduled batch updates and file distribution.

In some implementations of the above, calibration specifications may be archived over time and associated with calibration tasks for which they are used. For example, when an OEM or another party provides a new calibration specification for a particular vehicle model or model year, this new calibration specification may be associated with all calibration tasks then performed using that specification for that vehicle model or year, such that at any time in the future the exact calibration specification that was referenced in calibrating or repairing a specific vehicle may be determined. This may also include retaining and associating different versions of calibration specifications with particular calibration tasks as such additional versions become available. For example, an OEM may provide an improved calibration specification for a past model year that is to be used in place of the original calibration specification for subsequent tasks. By retaining versions and enforcing associations between particular versions and tasks, it may be determined for a particular vehicle whether the improved specification or the original specification was used during ADAS calibration and repair.

The computing devices employed in this description comprise a processor and memory and may be of any type appropriate for receiving data from, manipulating data of, and transmitting data to other components of the systems. The processor and memory may be configured with instructions that may be executed in order to perform steps associated with the disclosed system and method. In some embodiments, the processor is a microcontroller or general purpose microprocessor that reads its program from the memory. The processor may be comprised of one or more components configured as a single unit. Alternatively, when of a multi-component form, the processor may have one or more components located remotely relative to the others. One or more components of the processor may be of the electronic variety including digital circuitry, analog circuitry, or both. In some embodiments, the processor is of a conventional, integrated circuit microprocessor arrangement. In alternative embodiments, one or more reduced instruction set computer (RISC) processors, application-specific integrated circuits (ASICs), general-purpose microprocessors, programmable logic arrays, or other devices may be used alone or in combinations as will occur to those skilled in the art.

Likewise, the memory in various embodiments includes one or more types such as solid-state electronic memory, magnetic memory, or optical memory, just to name a few. By way of non-limiting example, the memory can include solid-state electronic Random Access Memory (RAM), Sequentially Accessible Memory (SAM) (such as the First-In, First-Out (FIFO) variety or the Last-In First-Out (LIFO) variety), Programmable Read-Only Memory (PROM), Electrically Programmable Read-Only Memory (EPROM), or Electrically Erasable Programmable Read-Only Memory (EEPROM); an optical disc memory (such as a recordable, rewritable, or read-only DVD or CD-ROM); a magnetically encoded hard drive, floppy disk, tape, or cartridge medium; a solid-state or hybrid drive; or a plurality and/or combination of these memory types. Also, the memory in various embodiments is volatile, nonvolatile, or a hybrid combination of volatile and nonvolatile varieties, and it may be integrated with other components such as processor.

The memory is configured to store received data and can store data received from the processor so that it may later be modified or referenced by the processor or another connected device. The memory may be or comprise, for example, an integrated or removable solid-state drive, flash drive, memory card, or other data storage device capable of being written to and read from, and capable of storing written data for extended periods of time in the absence of a persistent external power source. The memory allows the various disclosed components to persistently store programming and data.

VI. Exemplary Combinations

EXAMPLE 1

A distributed calibration system comprising: (a) a management server in communication with a plurality of hubs that are positioned in a plurality of local environments, the management server configured to operate a workflow engine that enforces a workflow associated with calibration of advanced driver assistance systems ("ADAS"); (b) a hub positioned at a local environment in the plurality of local environments and configured to provide a dedicated network in the local environment; and (c) a set of edge devices positioned in the local environment and configured to communicate over the dedicated network, the set of edge devices comprising a local technician device; wherein the workflow engine is configured to: (i) receive a calibration request associated with a vehicle and create a calibration workflow for that vehicle in response, wherein the calibration workflow comprises a plurality of steps, and the plurality of steps comprises one or more vehicle preparation steps and one or more vehicle calibration steps; (ii) pass control for the vehicle preparation steps to the local technician device in the local environment and receive a preparation dataset in response; (iii) determine a set of ADAS features of the vehicle that are to be calibrated based on the preparation dataset; (iv) pass control for the vehicle calibration steps to the local technician device and to a remote technician device, wherein the remote technician device is not positioned in the local environment and communicates with the local technician device through the hub; and (v) provide data for displaying a first collaborative calibration interface via the local technician device and a second collaborative calibration interface via the remote technician device, where the first collaborative calibration interface and the second collaborative calibration interface are configured to perform the one or more vehicle calibration steps.

EXAMPLE 2

The system of example 1, further comprising a diagnostic scanner adapted to communicatively couple with an electrical control unit ("ECU") of the vehicle, and wherein the one or more vehicle preparation steps comprise a vehicle scan step configured to, when performed with the local technician device: (i) receive a set of ECU data associated with the vehicle; (ii) transmit the set of ECU data to the management server as part of the preparation dataset; (iii) display a calibration selection interface based on the set of ECU data and receive a selection indicating the set of ADAS features; and (iv) provide the set of ADAS features to the management server as part of the preparation dataset.

EXAMPLE 3

The system of example 2, wherein the workflow engine is configured to, during performance of the one or more calibration steps: (i) receive a set of ADAS sensor data from the diagnostic scanner via the hub; (ii) provide the set of ADAS sensor data to the remote technician; (iii) receive an updated ADAS calibration from the remote technician; and (iv) write the updated ADAS calibration to the ECU via the diagnostic scanner and the hub.

EXAMPLE 4

The system of any one or more of examples 1 through 3, wherein the workflow engine is configured to, when passing control of a step to a performer device: (i) identify a next step based upon the calibration workflow; (ii) pass control of the next step to the performer device by providing a control dataset that is configured to: (A) cause the performer device to display a description of the next step, and (B) configure the performer device so that it is usable to perform the next step; wherein the performer device is one of the local technician device and the remote technician device.

EXAMPLE 5

The system of example 4, wherein the workflow engine is configured to, after passing control of the step to the performer device: (i) receive a performance dataset from the performer device that describes the status of the step; (ii) save the performance dataset and associate the performance dataset with the step; (iii) receive an indication from the performer device that the step is complete; (iv) update the calibration workflow to reflect the completion of the step; and (v) identify a subsequent next step based upon the calibration workflow.

EXAMPLE 6

The system of any one or more of examples 1 through 5, the set of edge devices further comprising a vehicle calibration station operable to automatically position a target surface relative to the vehicle, wherein the workflow engine is configured to, after providing data for displaying the collaborative calibration interface: (i) pass control of a vehicle staging task to the local technician device and receive a response indicating that the vehicle staging task is complete; (ii) pass control of a target positioning task to the vehicle calibration station via the hub, wherein the target positioning task is configured to cause the vehicle calibration station to automatically position and receive a response indicating that the target positioning task is complete; (iii) pass control of a calibration task to the remote technician device, wherein the calibration task is configured to allow the remote technician device to: (A) receive diagnostic data from an ADAS feature of the vehicle that is generated based upon the position of the target surface; and (B) update a calibration of the ADAS feature by transmitting data to the ECU of the vehicle via the management server and the hub.

EXAMPLE 7

The system of example 6, wherein the collaborative calibration interface on the local technician device comprises an emergency stop feature that, when activated, causes the local technician device to transmit an electronic signal to the vehicle calibration station that is configured to prevent automatic positioning of the target surface.

EXAMPLE 8

The system of any one or more of examples 6 through 7, wherein the collaborative calibration interface on the local technician device comprises a remote connection feature that, when activated, establishes an audio or video communication channel between the local technician device and the remote technician device.

EXAMPLE 9

The system of any one or more of examples 1 through 8, wherein: (i) the hub comprises a hardware security module configured to prevent unauthenticated modifications to configurations of the hub; (ii) the hub is configured so that the management server is the only device outside the local environment that the hub will accept data from; (iii) the hub is configured to only communicate with devices within the local environment that are configured to execute a hub agent; and (iv) each of the set of edge devices is configured to execute the hub agent.

EXAMPLE 10

The system of any one or more of examples 1 through 9, wherein the workflow engine is configured to, prior to passing control for a step to a performer device: (i) identify a person associated with the performer device and identify a persona dataset associated with the person, wherein the persona dataset is stored by the management server; (ii) determine whether the person is credentialed to perform the step based on a set of certification data in the persona dataset; (iii) determine whether the person is restricted from performing the step based on a set of restriction data in the persona dataset; and (iv) where the person is credentialed and not restricted, pass control for the step to the performer device and enable the performer device for the performance of the step.

EXAMPLE 11

The system of any one or more of examples 1 through 10, wherein the workflow engine is configured to: (i) receive a raw calibration dataset from a data provider; (ii) verify that the raw calibration dataset complies with a set of verification requirements defined by the workflow engine and contains a metadata file; (iii) parse the raw calibration dataset to produce a typed calibration dataset; (iv) create a calibration specification archive based on the typed calibration dataset; and (v) provide the calibration specification archive to a plurality of local technician devices.

EXAMPLE 12

A method comprising the steps: (a) providing a dedicated network with a hub positioned in a local environment; (b) configuring a set of edge devices positioned in the local environment to communicate over the dedicated network, the set of edge devices comprising a local technician device and a diagnostic sensor; (c) at a workflow engine that is outside of the local environment and in communication with the hub, receiving a calibration request associated with a vehicle in the local environment and creating a calibration workflow for that vehicle in response, wherein the workflow engine is configured to enforce a workflow associated with calibration of advanced driver assistance systems ("ADAS") and the calibration workflow comprises a plurality of steps; and (d) for each of the plurality of steps, passing control for that step to a performer device associated with that step by providing data that enables the performer device to perform that step, where the performer device is selected from the set of edge devices; wherein the plurality of steps comprises a set of collaborative calibration steps that comprise: (i) displaying a set of instructions on the local technician device for coupling the diagnostic sensor with the vehicle; (ii) enabling the diagnostic sensor to receive a set of diagnostic data from an ADAS feature of the vehicle; (iii) receiving the set of diagnostic data at the workflow engine via the hub and providing the set of diagnostic data to a remote technician device; and (iv) receiving an updated ADAS calibration from the remote technician device at the workflow engine and writing the updated ADAS calibration to the ADAS feature of the vehicle via the hub and the diagnostic sensor.

EXAMPLE 13

The method of example 12, wherein passing control of the step to the performer comprises: (a) at the workflow engine, identifying a next step based upon the calibration workflow; (b) causing the performer device to display a description of the next step; and (c) configuring the performer device so that it is usable to perform the next step; wherein the performer device is one of the local technician device and the remote technician device.

EXAMPLE 14

The method of example 13, further comprising: (a) at the workflow engine, receiving a performance dataset from the performer devices that describes the status of the step; (b) saving and associating the performance data with the step; (c) receiving an indication from the performer device that the step is complete; (d) updating the calibration workflow to reflect the completion of the step; and (e) identifying a subsequent next step based upon the calibration workflow.

EXAMPLE 15

The method of any one or more of examples 12 through 14, further comprising causing a collaborative calibration interface to display on the local technician device during the set of collaborative calibration steps, wherein the collaborative calibration interface comprises a workflow guide that indicates a current step of the set of collaborative calibration steps that is being performed.

EXAMPLE 16

The method of example 15, further comprising providing via the collaborative calibration interface an emergency stop feature that, when activated, causes the local technician device to transmit an electronic signal to a vehicle calibration station of the set of edge devices that is configured to prevent the vehicle calibration station from automatically positioning a target surface relative to the vehicle.

EXAMPLE 17

The method of any one or more of examples 15 through 16, further comprising providing via the collaborative calibration interface a remote connection feature that, when activated, establishes an audio or video communication channel between the local technician device and the remote technician device.

EXAMPLE 18

The method of any one or more of examples 12 through 17, wherein the hub comprises a hardware security module configured to prevent unauthenticated modifications to configurations of the hub, further comprising: (a) configuring the hub so that a management server that executes the workflow engine is the only device outside the local environment that the hub accepts data from; (b) configuring the hub to only communicate with devices within the local environment that are configured to execute a hub agent; and (c) configuring each of the set of edge devices to execute the hub agent.

EXAMPLE 19

The method of any one or more of examples 12 through 18, further comprising, prior to passing control for a step to a performer device: (i) at the workflow engine, identifying a person associated with the performer device and identifying a persona dataset associated with the person; (ii) determining whether the person is credentialed to perform the step based on a set of certification data from the persona dataset; (iii) determining whether the person is restricted from performing the step based on a set of restriction data from the persona dataset; and (iv) where the person is credentialed and not restricted, passing control for the step to the performer device and enabling the performer device for the performance of the step.

EXAMPLE 20

A calibration system, comprising a processor, a memory in communication with the processor, and an advanced driver assistance system ("ADAS") diagnostic scanner in communication with the processor, the memory being encoded with programming instructions executable by the processor to: present a technician interface via a technician device, where the technician interface generates technician output and accepts technician input; control the diagnostic scanner to calibrate an ADAS of a vehicle having a vehicle identifier, the controlling being performed as a function of the technician input; store a repair history in the memory, where the repair history comprises the vehicle identifier, the technician input, and output from the diagnostic scanner;

and in response to a query containing the vehicle identifier, retrieve the repair history from the memory.

It should be understood that any one or more of the teachings, expressions, embodiments, examples, etc. described herein may be combined with any one or more of the other teachings, expressions, embodiments, examples, etc. that are described herein. The teachings, expressions, embodiments, examples, etc. herein should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

What is claimed is:

1. A distributed calibration system comprising:
    (a) a management server in communication with a plurality of hubs that are positioned in a plurality of local environments, the management server configured to operate a workflow engine that enforces a workflow associated with calibration of an advanced driver assistance system ("ADAS");
    (b) a hub positioned at a local environment in the plurality of local environments and configured to provide a dedicated network in the local environment, wherein the dedicated network is configured to only communicate with pre-authorized devices; and
    (c) a set of edge devices positioned in the local environment and configured to communicate over the dedicated network, the set of edge devices comprising a local technician device;
    wherein the workflow engine is configured to:
        (i) receive a calibration request associated with a vehicle and create a calibration workflow for that vehicle in response, wherein the calibration workflow comprises a plurality of steps, and the plurality of steps comprises one or more vehicle preparation steps and one or more vehicle calibration steps;
        (ii) in accordance with the calibration workflow, pass control over the one or more vehicle preparation steps to the local technician device in the local environment and receive a preparation dataset in response;
        (iii) determine a set of ADAS features of the vehicle that are to be calibrated based on the preparation dataset;
        (iv) in accordance with the calibration workflow, pass control over selected ones of the one or more vehicle calibration steps to the local technician device and to a remote technician device, wherein the remote technician device is not positioned in the local environment and communicates with the local technician device through the hub; and
        (v) provide data for displaying a first collaborative calibration interface via the local technician device and a second collaborative calibration interface via the remote technician device, where the first collaborative calibration interface and the second collaborative calibration interface are configured to perform the one or more vehicle calibration steps over which the respective device is passed control by the workflow engine.

2. The system of claim 1, further comprising a diagnostic scanner adapted to communicatively couple with an electrical control unit ("ECU") of the vehicle, and wherein the one or more vehicle preparation steps comprise a vehicle scan step configured to, when performed with the local technician device:
    (i) receive a set of ECU data associated with the vehicle;
    (ii) transmit the set of ECU data to the management server as part of the preparation dataset;
    (iii) display a calibration selection interface based on the set of ECU data and receive a selection indicating the set of ADAS features; and
    (iv) provide the set of ADAS features to the management server as part of the preparation dataset.

3. The system of claim 2, wherein the workflow engine is configured to, during performance of one or more vehicle calibration steps:
    (i) receive a set of ADAS sensor data from the diagnostic scanner via the hub;
    (ii) provide the set of ADAS sensor data to the remote technician device;
    (iii) receive an updated ADAS calibration from the remote technician device; and
    (iv) write the updated ADAS calibration to the ECU via the diagnostic scanner and the hub.

4. The system of claim 1, wherein the workflow engine is configured to, when passing control of a step to a performer device:
    (i) identify a next step based upon the calibration workflow;
    (ii) pass control of the next step to the performer device by providing a control dataset that is configured to:
        (A) cause the performer device to display a description of the next step, and
        (B) configure the performer device so that it is usable to perform the next step;
    wherein the performer device is one of the local technician device and the remote technician device selected by the workflow engine.

5. The system of claim 4, wherein the workflow engine is configured to, after passing control of the step to the performer device:
    (i) receive a performance dataset from the performer device that describes a status of the step;
    (ii) save the performance dataset and associate the performance dataset with the step;
    (iii) receive an indication from the performer device that the step is complete;
    (iv) update the calibration workflow to reflect completion of the step; and
    (v) identify a subsequent next step based upon the calibration workflow.

6. The system of claim 1, the set of edge devices further comprising a vehicle calibration station operable to automatically position a target surface relative to the vehicle, wherein the workflow engine is configured to, after providing data for displaying the first and second collaborative calibration interfaces:

(i) pass control of a vehicle staging task to the local technician device and receive a response indicating that the vehicle staging task is complete;
(ii) pass control of a target positioning task to the vehicle calibration station via the hub, wherein the target positioning task is configured to cause the vehicle calibration station to automatically position the target surface and receive a response indicating that the target positioning task is complete;
(iii) pass control of a calibration task to the remote technician device, wherein the calibration task is configured to allow the remote technician device to:
(A) receive diagnostic data from an ADAS feature of the vehicle that is generated based upon the position of the target surface; and
(B) update a calibration of the ADAS feature by transmitting data to the ECU of the vehicle via the management server and the hub.

7. The system of claim 6, wherein the first collaborative calibration interface on the local technician device comprises an emergency stop feature that, when activated, causes the local technician device to transmit an electronic signal to the vehicle calibration station that is configured to prevent automatic positioning of the target surface.

8. The system of claim 6, wherein the first collaborative calibration interface on the local technician device comprises a remote connection feature that, when activated, establishes an audio or video communication channel between the local technician device and the remote technician device.

9. The system of claim 1, wherein:
(i) the hub comprises a hardware security module configured to prevent unauthenticated modifications to configurations of the hub;
(ii) the hub is configured to accept data from the management server and no other device outside the local environment;
(iii) the hub is configured to communicate with devices within the local environment that are configured to execute a hub agent and no other devices within the local environment; and
(iv) each of the set of edge devices is configured to execute the hub agent.

10. The system of claim 1, wherein the workflow engine is configured to, prior to passing control for a step to a performer device:
(i) identify a person associated with the performer device and identify a persona dataset associated with the person, wherein the persona dataset is stored by the management server;
(ii) determine whether the person is credentialed to perform the step based on a set of certification data in the persona dataset;
(iii) determine whether the person is restricted from performing the step based on a set of restriction data in the persona dataset; and
(iv) if and only if it has been determined that the person is credentialed and not restricted, pass control for the step to the performer device and enable the performer device for the performance of the step.

11. The system of claim 1, wherein the workflow engine is configured to:
(i) receive a raw calibration dataset from a data provider;
(ii) verify that the raw calibration dataset complies with a set of verification requirements defined by the workflow engine and contains a metadata file;
(iii) parse the raw calibration dataset to produce a typed calibration dataset;
(iv) create a calibration specification archive based on the typed calibration dataset; and
(v) provide the calibration specification archive to a plurality of local technician devices.

12. A method for distributed calibration of an advanced driver assistance system ("ADAS"), comprising the steps:
(a) providing a dedicated network comprising a hub positioned in a local environment, wherein the dedicated network is configured to only communicate with pre-authorized devices;
(b) configuring a set of edge devices positioned in the local environment to communicate over the dedicated network, the set of edge devices comprising a local technician device and a diagnostic scanner;
(c) at a workflow engine that is outside of the local environment and in communication with the hub, receiving a calibration request associated with a vehicle in the local environment and creating a calibration workflow for that vehicle in response, wherein the workflow engine is configured to enforce a workflow associated with calibration of an ADAS and the calibration workflow comprises a plurality of steps; and
(d) for each of the plurality of steps in the calibration workflow, passing control for that step to a performer device associated with that step by providing data that enables the performer device to perform that step, where the performer device is selected from the set of edge devices;
wherein the plurality of steps comprises a set of collaborative calibration steps that comprise:
(i) displaying a set of instructions on the local technician device for coupling the diagnostic scanner with the vehicle;
(ii) enabling the diagnostic scanner to receive a set of diagnostic data from an ADAS feature of the vehicle;
(iii) receiving the set of diagnostic data at the workflow engine via the hub and providing the set of diagnostic data to a remote technician device; and
(iv) receiving an updated ADAS calibration from the remote technician device at the workflow engine and writing the updated ADAS calibration to the ADAS feature of the vehicle via the hub and the diagnostic scanner.

13. The method of claim 12, wherein passing control of the step to the performer comprises:
(a) at the workflow engine, identifying a next step based upon the calibration workflow;
(b) causing the performer device to display a description of the next step; and
(c) configuring the performer device so that it is usable to perform the next step;
wherein the performer device is one of the local technician device and the remote technician device.

14. The method of claim 13, further comprising:
(a) at the workflow engine, receiving a performance dataset from the performer devices that describes a status of the step;
(b) saving and associating the performance data with the step;
(c) receiving an indication from the performer device that the step is complete;
(d) updating the calibration workflow to reflect completion of the step; and
(e) identifying a subsequent next step based upon the calibration workflow.

15. The method of claim 12, further comprising causing a collaborative calibration interface to display on the local technician device during the set of collaborative calibration steps, wherein the collaborative calibration interface comprises a workflow guide that indicates a current step of the set of collaborative calibration steps that is being performed.

16. The method of claim 15, further comprising providing via the collaborative calibration interface an emergency stop feature that, when activated, causes the local technician device to transmit an electronic signal to a vehicle calibration station of the set of edge devices that is configured to prevent the vehicle calibration station from automatically positioning a target surface relative to the vehicle.

17. The method of claim 15, further comprising providing via the collaborative calibration interface a remote connection feature that, when activated, establishes an audio or video communication channel between the local technician device and the remote technician device.

18. The method of claim 12, wherein the hub comprises a hardware security module configured to prevent unauthenticated modifications to configurations of the hub, further comprising:
   (a) configuring the hub to accept data from a management server and no other device outside the local environment that executes the workflow engine;
   (b) configuring the hub to communicate with devices within the local environment that are configured to execute a hub agent and no other devices within the local environment; and
   (c) configuring each of the set of edge devices to execute the hub agent.

19. The method of claim 12, further comprising, prior to passing control for a step to a performer device:
   (i) at the workflow engine, identifying a person associated with the performer device and identifying a persona dataset associated with the person;
   (ii) determining whether the person is credentialed to perform the step based on a set of certification data from the persona dataset;
   (iii) determining whether the person is restricted from performing the step based on a set of restriction data from the persona dataset; and
   (iv) where the person is credentialed and not restricted, passing control for the step to the performer device and enabling the performer device for the performance of the step.

20. The method of claim 12, further comprising:
   (i) at the workflow engine, receiving a raw calibration dataset from a data provider;
   (ii) verifying that the raw calibration dataset complies with a set of verification requirements defined by the workflow engine and contains a metadata file;
   (iii) responsively to said verifying, parsing the raw calibration dataset to produce a typed calibration dataset;
   (iv) creating a calibration specification archive based on the typed calibration dataset; and
   (v) providing the calibration specification archive to a plurality of local technician devices.

* * * * *